(12) United States Patent
Purkayastha et al.

(10) Patent No.: US 12,477,424 B2
(45) Date of Patent: Nov. 18, 2025

(54) EXTENDED 5G LOCAL AREA NETWORK INTERWORKING WITH A HOME NETWORK AND CHANGE OF ACCESS NETWORK FOR 5G LAN CONNECTED DEVICES

(71) Applicant: InterDigital Patent Holdings, Inc., Wilmington, DE (US)

(72) Inventors: Debashish Purkayastha, Collegeville, PA (US); Robert Gazda, Spring City, PA (US); Michel Roy, Candiac (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 509 days.

(21) Appl. No.: 17/915,227

(22) PCT Filed: Apr. 1, 2021

(86) PCT No.: PCT/US2021/025406
§ 371 (c)(1),
(2) Date: Sep. 28, 2022

(87) PCT Pub. No.: WO2021/202891
PCT Pub. Date: Oct. 7, 2021

(65) Prior Publication Data
US 2023/0164641 A1    May 25, 2023

Related U.S. Application Data

(60) Provisional application No. 63/053,029, filed on Jul. 17, 2020, provisional application No. 63/004,109, filed on Apr. 2, 2020.

(51) Int. Cl.
*H04W 36/14* (2009.01)
*H04W 36/00* (2009.01)
*H04W 36/02* (2009.01)

(52) U.S. Cl.
CPC ....... *H04W 36/14* (2013.01); *H04W 36/0022* (2013.01); *H04W 36/023* (2013.01)

(58) Field of Classification Search
CPC ............ H04W 36/14; H04W 36/0022; H04W 36/023
(Continued)

(56) References Cited

U.S. PATENT DOCUMENTS

| | | | | |
|---|---|---|---|---|
| 2020/0145876 | A1* | 5/2020 | Dao | ..................... H04L 12/1407 |
| 2021/0112127 | A1* | 4/2021 | Zhu | ....................... H04L 69/321 |
| 2022/0182321 | A1* | 6/2022 | Landais | .................. H04L 45/74 |

OTHER PUBLICATIONS

Nokia et al, "General description of ATSSS and Multi-Acess Rule," 3G00 Draft; CP-193051, 3rd Generation Partnership Project (3GPP), Mobile Competence Centre; vol. CT WG4, No. Portoroz, Slovenia; Nov. 20, 2019, 11 pages.

(Continued)

*Primary Examiner* — Michael Y Mapa
(74) *Attorney, Agent, or Firm* — Chris Kolefas

(57) ABSTRACT

A method performed by a network entity includes receiving a first instruction element (IE) indicating an identity of a wireless device and receiving a second IE indicating an action to buffer data intended for the wireless device, buffering the data intended for the wireless device, receiving a third IE indicating the identity of the wireless device and receiving a fourth IE indicating an action to stop buffering data and release the buffered data intended for the wireless device. The network entity then may transmit at least a portion of the buffered data to the wireless device.

20 Claims, 24 Drawing Sheets

Steps to Handle Change of Access Network in 5G LAN

(58) Field of Classification Search
USPC .................. 370/331; 455/414.4, 432.2, 41.2
See application file for complete search history.

(56) References Cited

OTHER PUBLICATIONS

Orange et al: "Use of N9 for direct routing of traffic between different PDU Sessions", 3GPP Draft; S2-1903831 N9, 3rd Generation Partnership Project (3GPP), vol. SA WG2, No. Xi'an, Apr. 2, 2019, 11 pages.

3GPP TS 29.244 V16.1.0 3rd Generation Partnership Project; Technical Specification Group Core Network and Terminals; Interface between the Control Plane and the User Plane Nodes; Stage 3 (Release 16), Sep. 2019, 122 pages.

3GPP TS 23.502 V16.0.2 Technical Specification Group Services and System Aspects; Procedures for the 5G System; Stage 2 (Release 16), 3GPP Standard; Technical Specification; 3GPP TS 23.502, 3rd Generation Partnership Project (3GPP), Mobile Competence Centre; 650, Route Des Lucioles; F-06921 Sophia-Antipoles Cedex; France, vol. SA WG2, No. V16.0.2, Apr. 1, 2019 (Apr. 1, 2019), pp. 419.

3GPP TS 23.501 V16.0.2 3rd Generation Partnership Project; Technical Specification Group Services and System Aspects: Procedures for the 5G System: Stage 2, Release 16, Apr. 2019, 317 pages.

3GPP TS 23.501 V16.4.0; 3rd Generation Partnership Project; Technical Specification Group Services and System Aspects; System architecture for the 5G System (5GS); Stage 2(Release 16); Mar. 2020, 439 pages.

3GPP TS 29.244 V16.3.1 (Apr. 2020) 3rd Generation Partnership Project; Technical Specification Group Core Network and Terminals; Interface between the Control Plane and the User Plane Nodes; Stage 3 (Release 16), Sep. 2019, 122 pages.

3GPP TS 23.502 V16.4.0 Technical Specification Group Service and System Aspects; Procedures for the 5G Systems; Stage 2 (Release 16)3GPP Draft: 23502-G40 CRS Implemted, 3GPPMOBILE Competence Centre; 650, Route Des Lucioles ; F-06921 Sophia-Antipolis Cedex France Mar. 25, 2020, 213 pages.

Ericsson: "Quota Action Buffering," 3GPP Draft; 29244 CR0097R2 (Rel-15) C4-183442, 3rd Generation Partnership Project (3GPP), vol. CT WG4, No. Kunming, China; Jun. 1, 2018, 14 pages.

\* cited by examiner

Nx-based User Plane Architecture in Non-roaming Scenario

Support of Trusted and Un-trusted Non 3GPP Access

Example 5G LAN Among 5G Devices and Devices on Private LAN

Steps to create an Extended 5G LAN Service

Extended 5G LAN service setup

Configuration Update High-Level Steps for Unavailability

UPF Update for Unavailability

Configuration Update for Device Availability

UPF Configuration for Device Availability

Packet Encapsulation for Forwarding Buffered Packets

EXTENDED 5G LOCAL AREA NETWORK INTERWORKING WITH A HOME NETWORK AND CHANGE OF ACCESS NETWORK FOR 5G LAN CONNECTED DEVICES

CROSS REFERENCE TO RELATED APPLICATIONS

This application is a U.S. National Stage Application under 35 U.S.C. 371 of International Patent Application No. PCT/US2021/025406, filed Apr. 1, 2021, which claims the benefit of U.S. provisional patent application No. 63/004,109 filed 2 Apr. 2020 and US provisional patent application No. 63/053,029 filed 17 Jul. 2020 which are incorporated by reference herein in their entirety.

BACKGROUND

Fifth Generation (5G) wireless technology promises to deliver ultra-fast speeds and responsiveness to connect everything, without interruption. This technology has been designed to accommodate the changing needs of connectivity demands.

5G local area network (5G LAN)-type services with 5G capabilities (e.g. performance, long distance access, mobility, security) allows a restricted set of user equipment (UE)s otherwise known as wireless transmit receive units (WTRUs) to communicate with each other. 5G LAN-type service supports an ethernet type transport over 5G wireless links.

One of the promises of 5G is the convergence of fixed and mobile networks. This situation is especially challenging in a residential environment (also known as "in-home" environment) where in some cases 5G will even augment or displace the existing infrastructures. The introduction of the 5G in the residential environment will solve many coverage and QoS problems that home owners are suffering with the current solutions. In order to achieve this goal, the third-generation partnership program (3GPP) network operators should support LAN-style services over the 5G system. Homeowners will demand the same functionality and levels of privacy and security that current solutions provide for their home networks (e.g. privacy and security while communicating within a set of devices).

Until 5G service can completely replace "in-home LAN", it can be assumed that "5G LAN Type" service will coexist with "in-home LAN" services. It will be beneficial to allow these two LANs (5G LAN and non-5G LAN) to interact in scenarios such as "In-home gaming" or "Enterprise applications. If the two LANs can be interworked, then the end devices can interact maintaining the quality of experience over both 5G and non-5G networks.

A future home will witness deployment of 5G inside home. 5G will co-exist with private LAN over Wi-Fi and Wired Ethernet. ISPs like Cable, Satellite, DSL, Wired network operator will provide service inside home or enterprise. This may be referred to as "Private LAN" hereinbelow.

5G LAN-type service allow a restricted set of 3GPP WTRUs to communicate amongst each other. 5G LAN-type service supports an ethernet type transport over 5G wireless links. In 5GS, Ethernet Protocol Data Unit (PDU) sessions may be used to create a LAN/Virtual LAN (VLAN) among 5G devices in a 5G network and non-3GPP devices in a home or enterprise network. In a home or enterprise, devices using non-3GPP technology, may connect to 5GS through interworking function such as Non-3GPP Interworking Function (N3IWF) or through Residential Gateways (RG).

Inside a home or enterprise, it is assumed that 3GPP and non-3GPP devices may communicate among each other using 5G LAN type service, creating an extended "5G LAN" (e5G LAN as described hereinbelow). In this document "5G LAN", refers to a LAN which includes 5G devices on 5G network and other devices in a Private LAN. Users may switch between 5G and Private LAN (e.g. Wi-Fi network). When the devices change Radio Access Technology (RAT), it will be desirable that these devices continue to be served over 5G LAN.

This document describes the problem related to interworking of the two LANs and proposes interworking solutions. In addition, this document also describes the problem related to maintaining the 5G LAN service among participating devices (i.e. devices in 5G and Private LAN), as those devices change RAT. A solution is also proposed, which allows un-interrupted 5G LAN service as devices change access technology.

SUMMARY

In one embodiment, a method performed by a network entity includes receiving a first instruction element (IE) indicating an identity of a wireless device and receiving a second IE indicating an action to buffer data intended for the wireless device, buffering the data intended for the wireless device, receiving a third IE indicating the identity of the wireless device and receiving a fourth IE indicating an action to stop buffering data and release the buffered data intended for the wireless device. The network entity then may transmit at least a portion of the buffered data to the wireless device.

In one embodiment, a method performed by a fifth generation (5G) core apparatus includes receiving a list of third generation partnership program (3GPP) devices and non-3GPP devices that form a 5G local area network (5G LAN) group. The 5G core apparatus receives policy rules for the non-3GPP devices, selects a first user plane function that can implement/carry out/execute the policy rules and at least one device identifier of the devices that form the 5G LAN group, initiates at least one Nx reference point interface for communication between the first user plane function and a second user plane function, and generates a forward action rule for use by the first user plane function to support buffering data for a non-3GPP device in the 5G LAN group.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
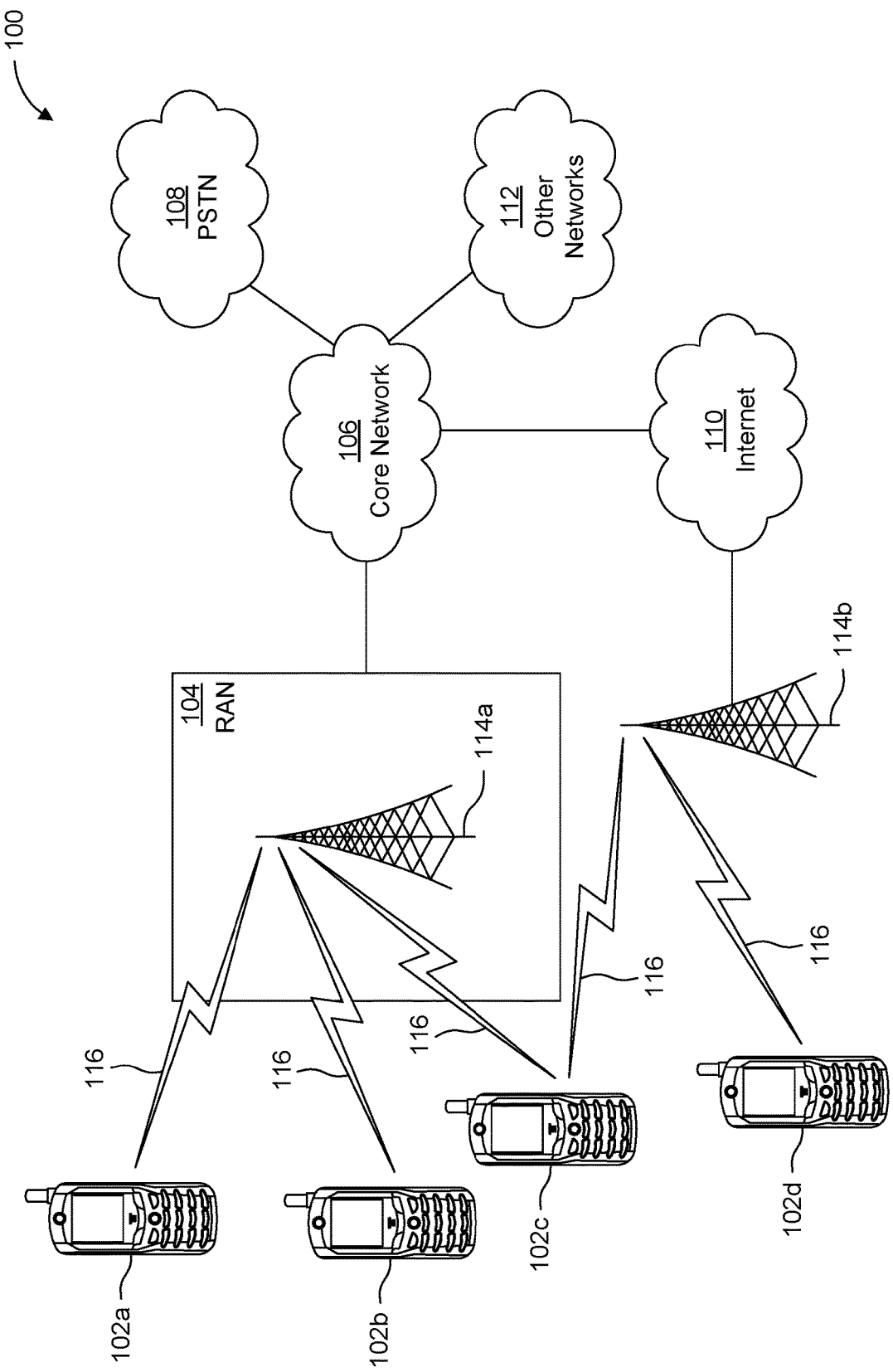
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
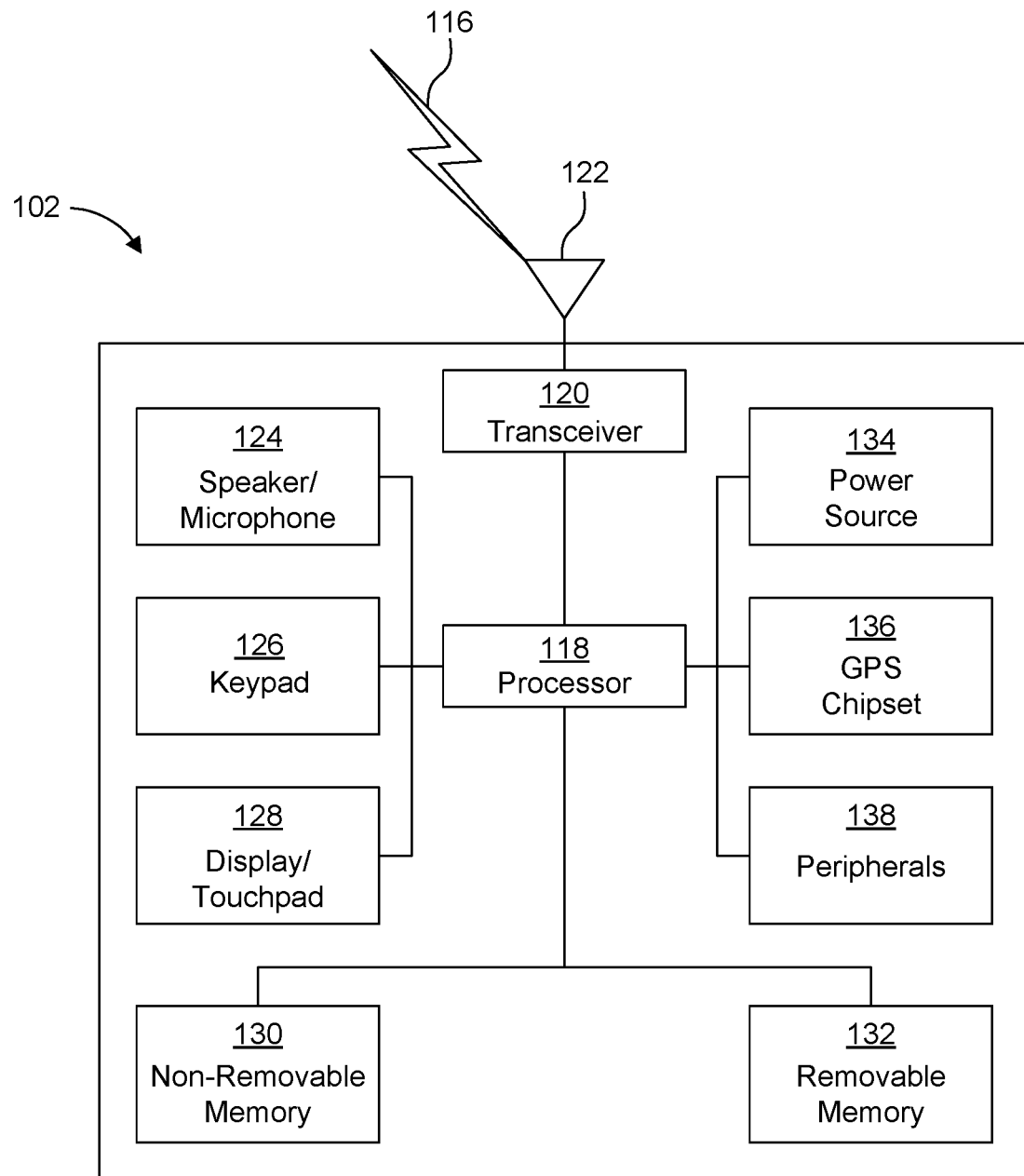
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
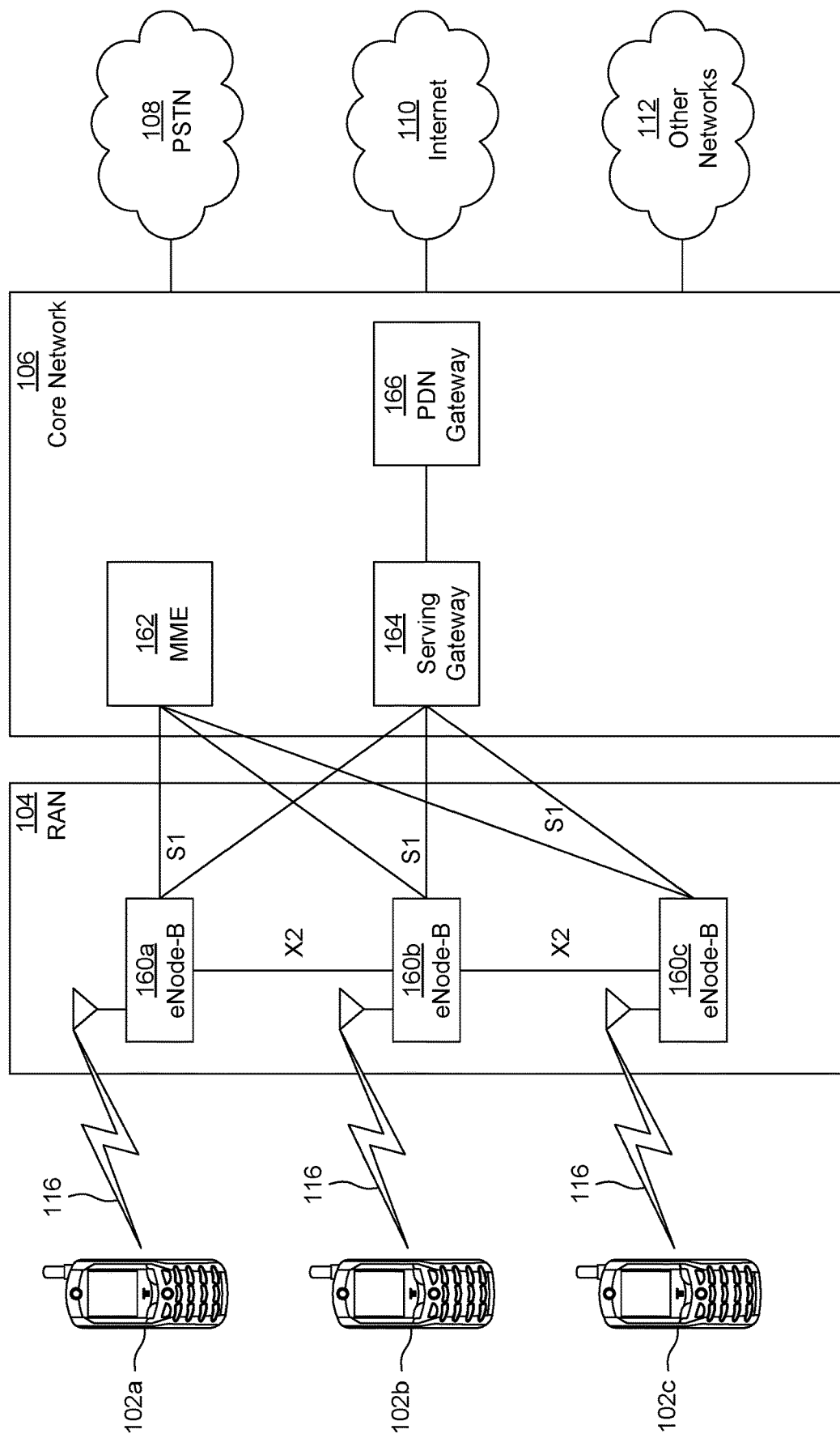
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the IEEE 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as IEEE 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of IEEE 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by IEEE 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for IEEE 802.11ah is 6 MHz to 26 MHz depending on the country code.

Figure 1D:
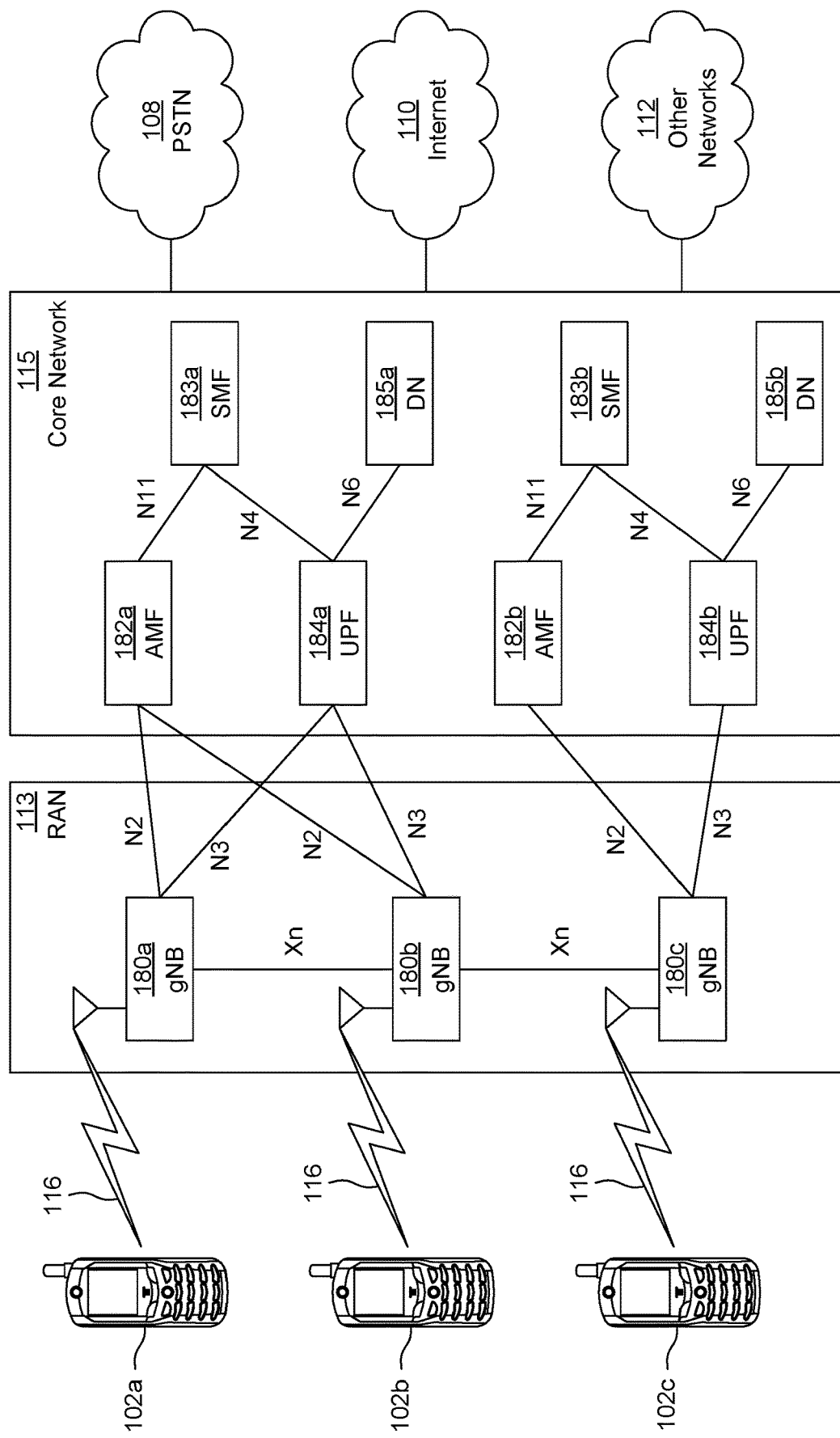
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit receive unit (WTRU) may be an example of a user equipment (UE). Hence the terms UE and WTRU may be used in equal scope herein.

BACKGROUND AND RELATED WORK

3GPP 5G LAN Type Service

3GPP has defined in detail how 5G LAN can be established in 3GPP TS 23.501 and 3GPP TS 23.502. 5G LAN Type Service is defined as a service over the 5G system offering private communication using internet protocol (IP) and/or non-IP type communications. 3GPP also defines 5G LAN-Virtual Network as a virtual network over the 5G system capable of supporting 5G LAN-type service.

For quick reference, some relevant information is copied verbatim herein from 3GPP TS 23.501 and 3GPP TS 23.502 [A reader should always refer to the latest version of these standard documents as they keep evolving]. Please note, only relevant information has been copied in the following sections, to help readers gain background information about standard activity in the problem space.

User Plane Architecture to Support 5G LAN-Type Service

Figure 2:
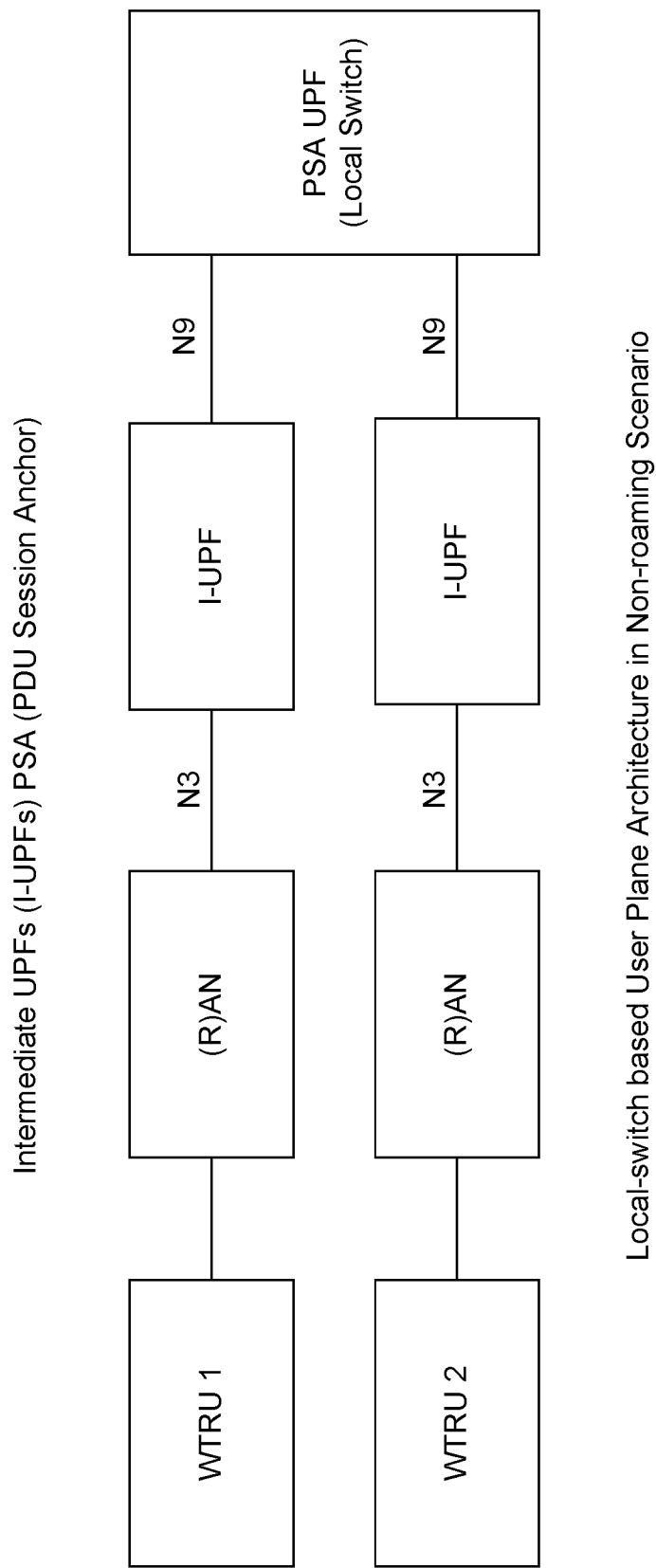
FIG. 2 depicts a local switch-based user plane architecture in a non-roaming scenario.
Figure 3:
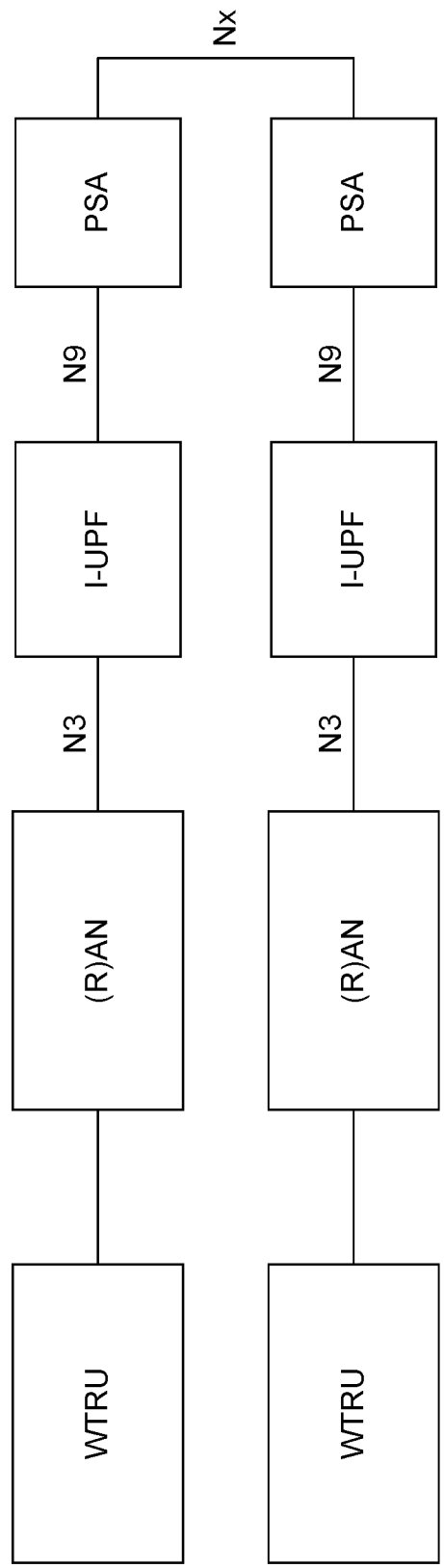
FIG. 3 depicts a Nx reference point connection-based user plane architecture in non-roaming scenario.

FIG. 2 depicts the non-roaming user plane architecture to support 5G LAN-type service using a local switch. FIG. 3 depicts the non-roaming user plane architecture to support 5G LAN-type service using a Nx reference point interface tunnel.

Reference Points to Support 5G LAN-Type Service

Figure 4:
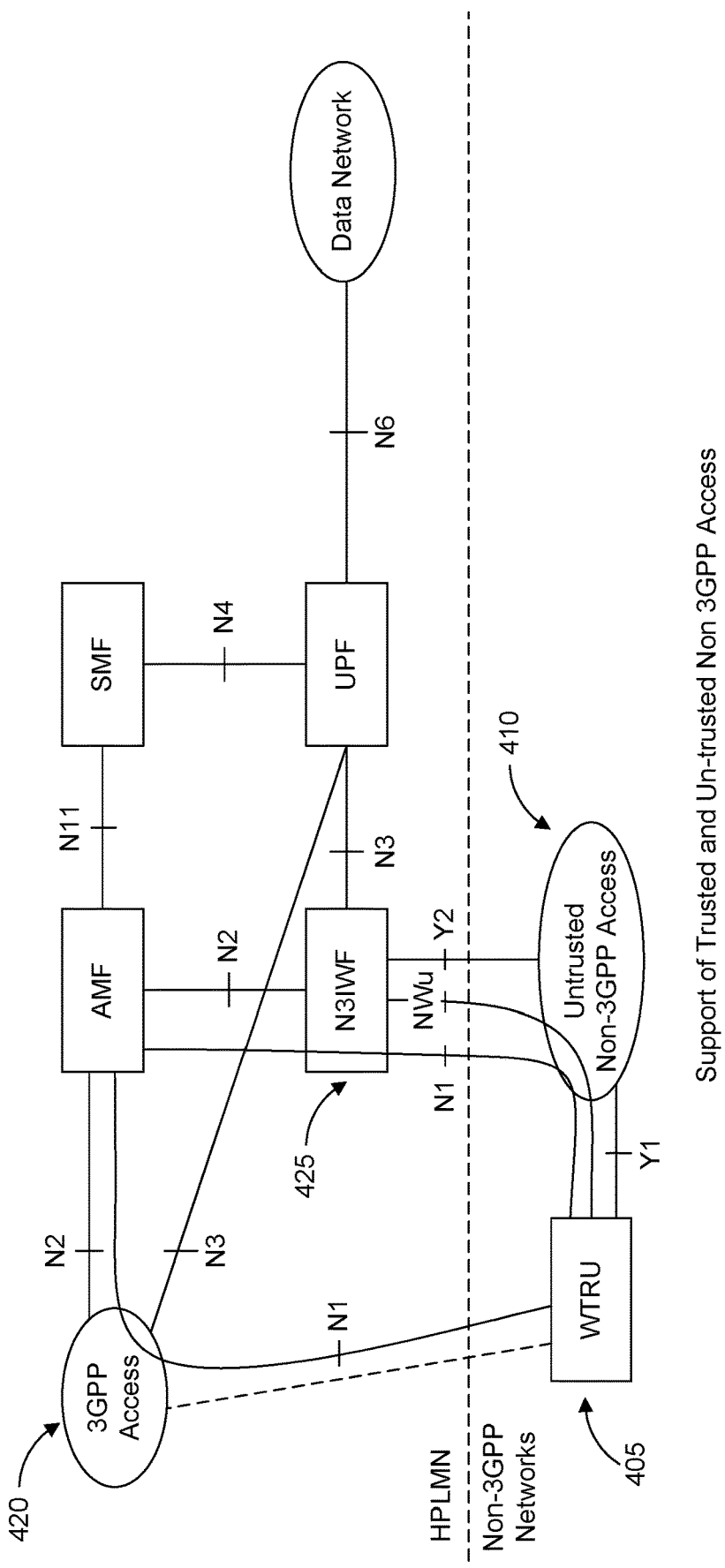
FIG. 4 depicts an architecture that supports trusted and un-trusted non-3GPP access.

As shown in FIG. 3, Nx is the reference point between two user plane functions (UPFs) for direct routing of traffic between different protocol data unit (PDU) sessions without using a N6 reference point interface. As shown in FIG. 4, N6 is the reference point interface between UPF and Data Network. N6 has a per 5G LAN group granularity. 3GPP defines 5G LAN Group as a set of WTRUs using private communication for 5G LAN-type service according to 3GPP TS 23.501.

Support for 5G-LAN Group Communication

In addition to N6-based forwarding of user plane traffic for 5G LAN group communication, the Session Management Function (SMF) and UPF may support local switch and Nx-based forwarding:

Local switch forwarding occurs where traffic is locally forwarded by a single UPF if this UPF is the common PDU Session Anchor (PSA) UPF of different PDU Sessions for the same 5G LAN group; See FIG. 2 for an example PSA UPF local switch.

Nx-based forwarding occurs where the uplink/downlink (UL/DL) traffic for the 5G-LAN communication is forwarded between PSA UPFs of different PDU sessions via Nx. Nx is based on a shared User Plane tunnel connecting PSA UPFs of a single 5G LAN group. See FIG. 3 for an example of a NX reference point interface.

The SMF may configure the UPF(s) to apply different traffic forwarding methods to route traffic between PDU Sessions for a single 5G LAN group. For example, depending on the destination address, some packet flows may be forwarded locally, while other packet flows are forwarded via Nx and other packet flows are forwarded to N6. The local switch and Nx-based forwarding methods require that a common SMF is controlling the PSA UPFs for the 5G-LAN group.

When unified data management/unified data repository (UDM/UDR) updates the 5G LAN group information as requested by the application function (AF) via the network exposure function (NEF) or by operations, administration, and management (OA&M), the UDM will update the user profile for 5G LAN group member WTRUs. Then the UDM notifies/transmits the updated user profile to the affected access and mobility management function (AMF), session management function (SMF), and policy control function (PCF) (using the Nudm_SDM_Info service operation).

For a PDU Session that corresponds to the AF request, the PCF provides the SMF with a policy and charging control (PCC) rule that is generated based on the AF request and considers WTRU location presence in area of interest (i.e. Presence Reporting Area). The PCC rule contains the information to identify the traffic, information about the data network access identifier (DNAI)(s) towards which the traffic routing should apply and optionally, an indication of application relocation possibility and/or indication of WTRU IP address preservation. The PCC rule also contains per DNAI a traffic steering policy ID and/or N6 traffic routing information, if the N6 traffic routing information is explicitly provided in the AF request.

When the PCC rules are activated, the SMF may, based on local policies, take the information in the PCC rules into account to:
  a. (re)select user plane (UP) paths (including DNAI(s)) for PDU Sessions. The SMF is responsible for handling the mapping between the WTRU location (tracking area identifier (TAI)/Cell-Id) and DNAI(s) associated with UPF and applications and the selection of the UPF(s) that serve a PDU Session.
  b. Configure traffic steering at UPF, including activating mechanisms for traffic multi-homing or enforcement of an UL Classifier (UL CL). This may include that the SMF is providing the UPF with packet handling instructions (i.e. packet detection rules (PDRs) and forward action rules (FARs)) for steering traffic to the local access to the data network (DN). The packet handling instructions are generated by the SMF using the traffic steering policy ID and/or the N6 traffic routing information in the PCC rules corresponding to the applied DNAI. In the case of UP path reselection, the SMF may configure the source UPF to forward traffic to the UL CL/BP so that the traffic is steered towards the target UPF.

To enable local switch in a UPF, the following applies:
  a. The SMF provides FARs (Forwarding Action Rules) for 5G LAN group member N4 Sessions (i.e. N4 Session corresponding to PDU Session) with the Destination Interface set to "5G LAN internal" and the Network Instance set to represent the 5G LAN group in order to instruct the UPF to again perform classification of packets using the corresponding 5G LAN group relevant PDR (Packet Detection Rule)s.
  b. The SMF also provides PDRs for 5G LAN group member N4 Sessions (i.e. N4 session corresponding to PDU Session) with Source Interface set to "5G LAN internal" and the Network Instance set to represent the 5G LAN group in order to instruct the UPF to detect packets that have been sent for classification via the local switch. This is done by configuring the PDRs in the target 5G LAN group member N4 Session to includes the destination IP/MAC address(es) of these WTRUs.

To enable Nx-based forwarding in a UPF, the following applies:
  a. The SMF provides FARs for 5G LAN group member N4 Sessions (i.e. N4 Session corresponding to PDU Session) with FAR(s) with the Destination Interface set to "5G LAN Nx" and the Network Instance set to represent the 5G LAN group in order to instruct the UPF to again perform classification of packets using the corresponding 5G LAN group relevant PDRs.
  b. The SMF creates a group-level N4 session to each involved UPF for forwarding packets to a Nx tunnel. The SMF optionally configures the group-level N4 session for processing packets received from a Nx tunnel. Such a N4 session is created per UPF and 5G-LAN group (i.e. a group-level N4 session not corresponding to a PDU Session).
  c. The SMF provides relevant N4 rules (e.g. PDRs, QER (QoS Enforcement Rule)s, URR (Usage Reporting Rule)s and FARs) for the group-level N4 session applicable for the Nx tunnel(s) in the UPF. The SMF may provide PDRs for the group-level N4 session with the Source Interface set to "5G LAN Nx" and the Network Instance set to represent the 5G LAN group in order to instruct the UPF to detect packets that are targeting the Nx-based forwarding. In case of multiple Nx tunnels between different PSA UPFs, the SMF may provide N4 rules corresponding to the different Nx tunnels in a single group-level N4 Session.
  d. To match the traffic of the WTRU(s) whose traffic should be forwarded across the Nx tunnel, the PDRs of the group-level N4 Session includes the destination IP/MAC address(es) of these WTRUs.
  e. The SMF may proactively update N4 rules for a group level N4-Session to enable correct routing of packets towards WTRU whose PSA UPF has been reallocated.
  f. The SMF may also configure a default PDR in the group-level N4 Session to capture the packets pertaining to 5G LAN group communication with an unknown destination address and a URR to trigger reporting of such events. This enables the SMF to reactively configure relevant PDR and FAR to forward the packets to another UPF via Nx, based on the reports from UPF.

5G LAN Group Management

5G System supports 5G LAN Group Management, which can be configured by a network administrator or can be managed dynamically by an AF. The 5G LAN group member is uniquely identified by GPSI (Generic Public Subscription Identifier). Reference 3GPP TS23.501, Section 5.29.2.

Generic Public Subscription Identifier (GPSI) is needed for addressing a 3GPP subscription in different data networks outside of the 3GPP system. The 3GPP system stores within the subscription data the association between the GPSI and the corresponding Subscription Permanent Identifier (SUPI). GPSIs are public identifiers used both inside and outside of the 3GPP system. The GPSI is either a mobile station international subscriber directory number (MSISDN) or an External Identifier. If MSISDN is included in the subscription data, it may be possible that the same MSISDN value is supported in both a 5G System (5GS) and an evolved packet system (EPS).

In order to support dynamic 5G LAN Group Management, the NEF exposes a set of services to manage (e.g. add/delete) 5G LAN group and 5G LAN members. The 5G LAN group configuration is either provided by Operations, Administration and Maintenance (OA&M) (TRUSTED AF) to PCF or provided by an AF to the NEF. The 5G LAN group configuration is stored in the UDR (Unified Data Repository, See 3GPP TS 23.501).

The 5G LAN group configuration in UDR may include the following parameters: GPSI (i.e. WTRU Identities of the 5G LAN group), PDU session type, data network name (DNN), and single network slice selection assistance information (S-NSSAI). The third-party AF may update the WTRU Identities of the 5G LAN group at any time after the initial provisioning.

The PCF delivers 5G LAN group configuration information (DNN, S-NSSAI, PDU session type) to the WTRU for each GPSI that belongs to a 5G-LAN group. The 5G LAN group configuration information is delivered in the URSP (UE Route Selection Policy) from the PCF to the WTRU using the WTRU Configuration Update procedure for transparent WTRU Policy delivery.

PDU Session Management

Session management, as defined for 5GS, is applicable to 5G-LAN-type services with the following clarifications:
  a. A WTRU gets access to 5G LAN-type services via a PDU Session of IP PDU Session type or Ethernet PDU Session type.
  b. A PDU Session provides access to one and only one 5G-LAN group.
  c. A dedicated SMF is responsible for all the PDU Sessions for communication of a certain 5G-LAN group.
  d. A DNN is associated with a 5G-LAN group.
  e. The WTRU provides a DNN associated with the 5G-LAN group to access the 5G LAN-type services for that 5G-LAN group, using the PDU Session Establishment procedure.
  f. During establishment of the PDU Session, secondary authentication may be performed in order to authenticate and authorize the WTRU for accessing the DNN associated with the 5G-LAN group. Authentication and authorization for a DNN using secondary authentication implies authentication and authorization for the associated 5G-LAN group. There is no 5G-LAN group specific authentication or authorization defined in 3GPP.
  g. The SM level subscription data for a DNN and S-NSSAI available in UDM, applies to a DNN associated to a 5G-LAN group.
  h. Session management related policy control for a DNN is applicable to a DNN associated to a 5G-LAN group. This includes also usage of UE route selection policy (URSP), for the WTRU to determine how to route outgoing traffic to a PDU Session for a DNN associated to a 5G-LAN group.

User Plane Handling

User Plane management, as defined for 5GS, is applicable to 5G-LAN-type services with the following clarifications:
  a. There are three types of traffic forwarding methods for 5G-LAN communication:
    N6-based, where the UL/DL traffic for the 5G-LAN communication is forwarded to/from the DN;
    Nx-based, where the UL/DL traffic for the 5G-LAN communication is forwarded between PSA UPFs of different PDU sessions via Nx.
    Local switch, where traffic is locally forwarded by a single UPF if this UPF is the common PSA UPF of different PDU Sessions for the same 5G LAN group.
  b. The SMF handles the user plane paths of the 5G LAN group, including:
    Establishing Nx tunnels between PSA UPFs to support Nx-based traffic forwarding.
  c. For Ethernet PDU Session, the SMF may instruct the UPF(s) classify frames based on virtual local area network (VLAN) tags, and to add and remove VLAN tags, on frames received and sent on N6

Support Trusted and Untrusted Non-3GPP Access

The 5G Core Network supports connectivity of WTRUs via non-3GPP access networks, e.g. WLAN access networks. The 5G Core Network supports both untrusted non-3GPP access networks and trusted non-3GPP access networks (TNANs).

An untrusted non-3GPP access network may be connected to the 5G Core Network via a Non-3GPP Interworking Function (N3IWF), whereas a trusted non-3GPP access network may be connected to the 5G Core Network via a Trusted Non-3GPP Gateway Function (TNGF). Both the N3IWF and the TNGF interface with the 5G Core Network control plane (CP) and user plane (UP) functions via the N2 and N3 interfaces, respectively. See FIG. 4 depicting an example WTRU 305 interfacing with trusted 3GPP Access 420 and Un-trusted non 3GPP access 410.

The WTRU 405 connects to an untrusted non-3GPP access network 410 with procedures outside the scope of 3GPP and it is assigned an IP address. Any non-3GPP authentication method can be used, e.g. no authentication (in case of a free WLAN), EAP with pre-shared key, username/password, etc. When the WTRU decides to attach to 5G Core Network (5GC) network, the WTRU selects an N3IWF 425 in a 5G public land mobile network (PLMN), as described in 3GPP TS 23.501.

The WTRU 405 proceeds with the establishment of an IPsec Security Association (SA) with the selected N3IWF 425 by initiating an internet key exchange (IKE) initial exchange according to RFC 7296 Internet Key Exchange Protocol Version 2 (IKEv2). All subsequent IKE messages are encrypted and integrity protected by using the IKE SA established in this step.

The WTRU may initiate an IKE_AUTH exchange by sending an IKE_AUTH request message. The AUTH payload is not included in the IKE_AUTH request message, which indicates that the IKE_AUTH exchange may use Extensible Authentication Protocol (EAP) signaling (in this case EAP-5G signaling).

First Problem Statement

In a home or an enterprise, many devices will co-exist, including 3GPP and non-3GPP devices, connected to 3GPP and non-3GPP access networks. These networks may be managed by a single domain (such as a mobile network operator (MNO) or cable operator) or may be managed by separate domains (including private networks administered by a home or enterprise owner).

Figure 5:
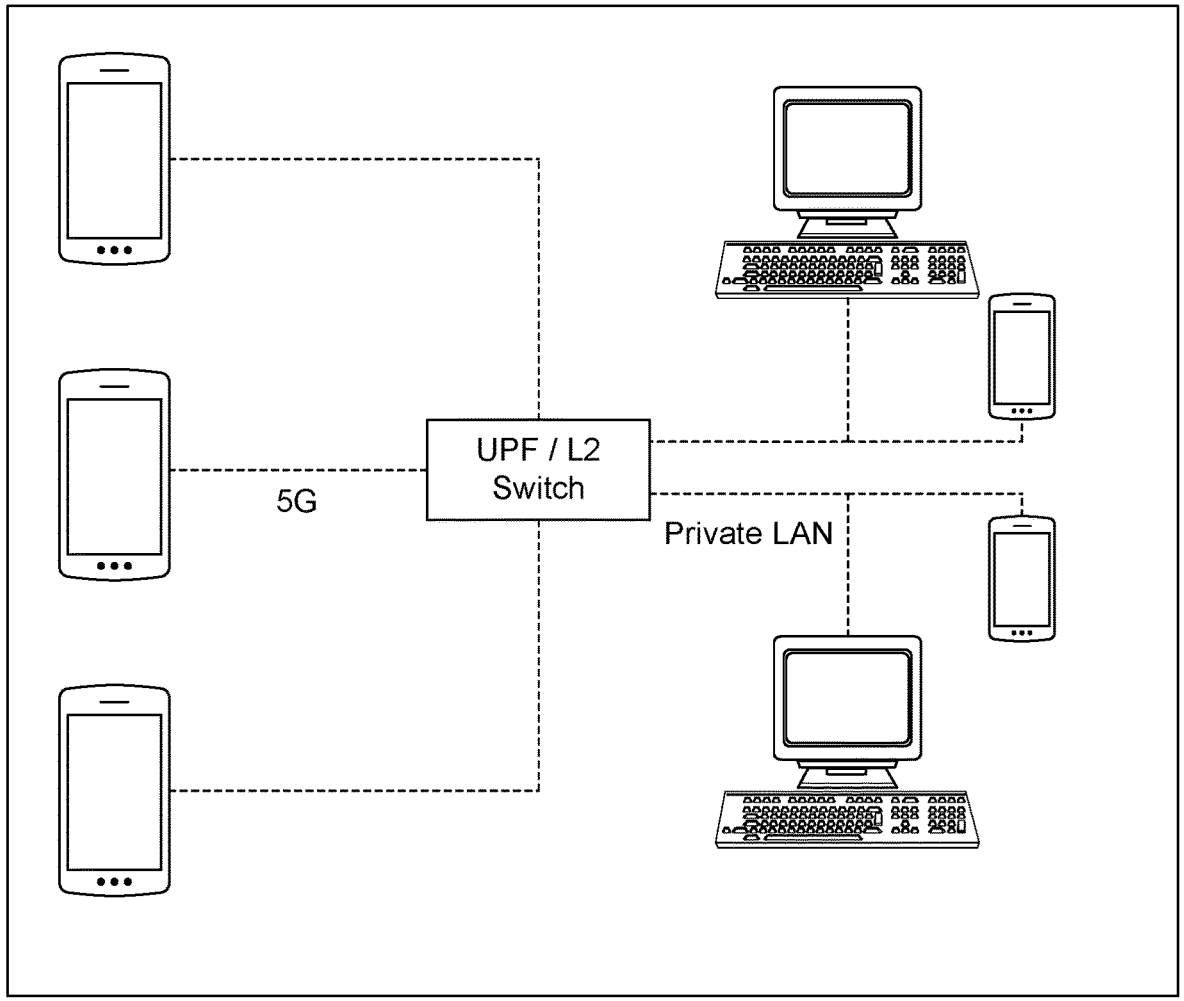
FIG. 5 depicts a LAN setup with 3GPP and non-3GPP access.

5G System is capable to provide 5G WTRU, layer 2 connectivity (Ethernet) rather than layer 3 connectivity (IP). Ethernet frames are sent over the 5G radio interface processed by radio protocols and then transported into the 5G Core using GPRS Tunneling Protocol (GTP)-U tunnels. 5G WTRU may become part of a LAN (Ethernet) where the rest of the LAN is placed in a company or organization somewhere in the Data Network outside the 5G System. Technically, the UPF will act as a L2 switch, operating on Ethernet frames. All devices on the LAN can communicate with each other. 3GPP is not offering anything more than the L2 connectivity. All devices on a LAN can communicate with no isolation among types of devices, applications, etc. An example LAN setup is shown in FIG. 5 having 3GPP and non 3GPP access.

5G and beyond 5G (B5G) applications such as NCIS (network control interactive services), interactive immersive gaming, etc. require low-latency, high-throughput communication among a group of selected devices. Co-existence of 3GPP and non-3GPP technology inside home may require creating such a group among 3GPP and non-3GPP devices.

3GPP addressed the topic of creating a group of devices to communicate among themselves using 5G LAN technology. 5G LAN provides a private communication mechanism among a group of devices, known as a 5G LAN Group. Future Home and other use cases require that some devices, which are part of a service or application, can communicate among themselves in a closed group.

Impacts to 5G virtual network (VN) group management and VN group communication to support 5G LAN-type service for WTRUs behind RGs (Residential Gateways) is included in the Enhancement of 5G LAN study.

5G LAN group members are identified by GPSI. Devices outside the 3GPP network, connected through private LAN, may not be identified by GPSI. Hence identifying non-3GPP devices in a 5G LAN is a problem. There is no known mechanism to include in this closed group of selected 5G devices, another device, which is not a 3GPP device. The device may be any in home or enterprise device, connected over Home or Enterprise LAN.

Figure 6:
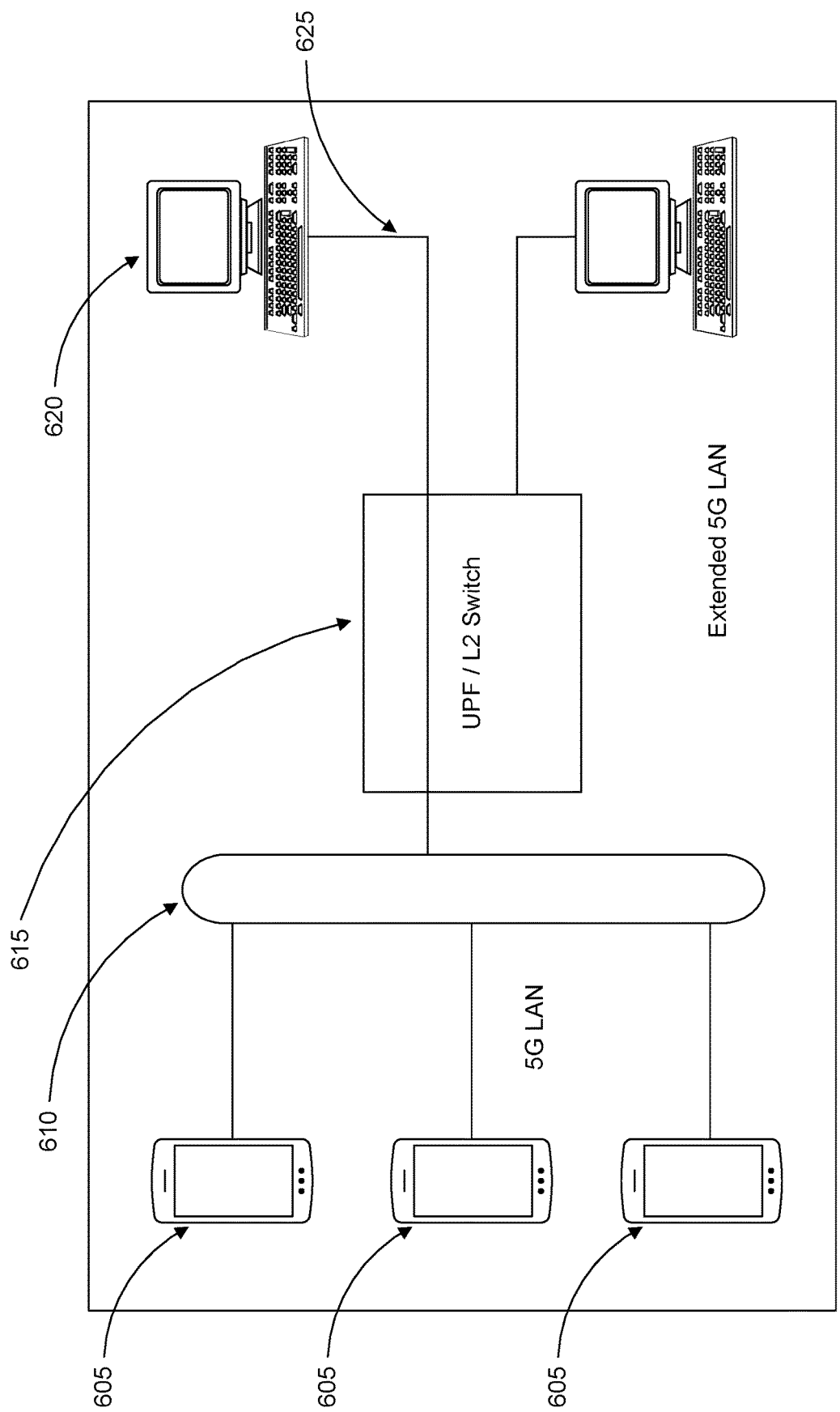
FIG. 6 depicts the setting up of 5G LAN with an external non-3GPP device.

In the case of 5G LAN-Type Service via a 5G LAN Group, one or more 5G devices 605 may be on a private LAN (private 5G LAN instance). In FIG. 6, a 5G LAN 610 is depicted as accommodating a non-3GPP device 620. PDU sessions are tunneled from one UPF to another. These tunnels are a unique per private 5G LAN instance. If any external device 620 wants to be part of a private 5G LAN instance (i.e. included in the 5G LAN group defining the private LAN), then the UPF 615 should be able to identify the tunnel 625 associated with the 5G LAN 610 and able to transfer PDUs from the specific tunnel 625 to external device 620 and from external device 620 to a specific tunnel 625 associated with the 5G LAN 610.

The following proposed embodiments can address the problem of integrating non-3GPP devices (inside home or enterprise) in a private 5G LAN instance (for convenience called a 5G LAN in herein).

Solution Summary Addressing First Problem Statement

An Extended 5G LAN (e5G LAN) service is defined herein that interconnects 3GPP 5G LAN devices attached to 3GPP access networks with non-3GPP devices attached to access networks such as such as IEEE 802.11, 802.3, etc. These access networks (3GPP and non-3GPP) may be owned or operated by different entities, such as mobile network operators (MNO's), cable service providers, homeowners, enterprises, etc.

Inside home or enterprise, not all non-3GPP devices are controlled and managed by 3GPP operators. If a non-3GPP device is managed and controlled by 3GPP operator, then N3IWF may be used to include those devices on a 5G LAN. It is noted that some devices which support Ethernet type communication and managed by a MNO may still need a special function. Herein, it is assumed that non-3GPP devices are third party untrusted devices and N3IWF may not be used to connect those devices to a 5G LAN.

As a baseline, it is desired that the Extended 5G LAN service have some or all of the following features:
  a. Minimize impacts on 5G Core (5GC), home network, enterprise network.
  b. Follow the same architecture as defined for 5G LAN type service in Release 16 (R16) and enhancements in R17.
  c. Support networks that are not fully controlled by a single entity, hence enabling an existing home device (non-3GPP) such as a tablet or sensor connecting over Wi-Fi to join the 5G LAN and communicate with a 5G device (and vice versa), without the device requiring any configuration from 3GPP network operator.
  d. Provide the same level of 5G network capabilities (e.g. Low Latency, High BW, Mobility etc.), within the constraints or characteristics of legacy, non-5G radio access technology (RAT)s.

Figure 7:
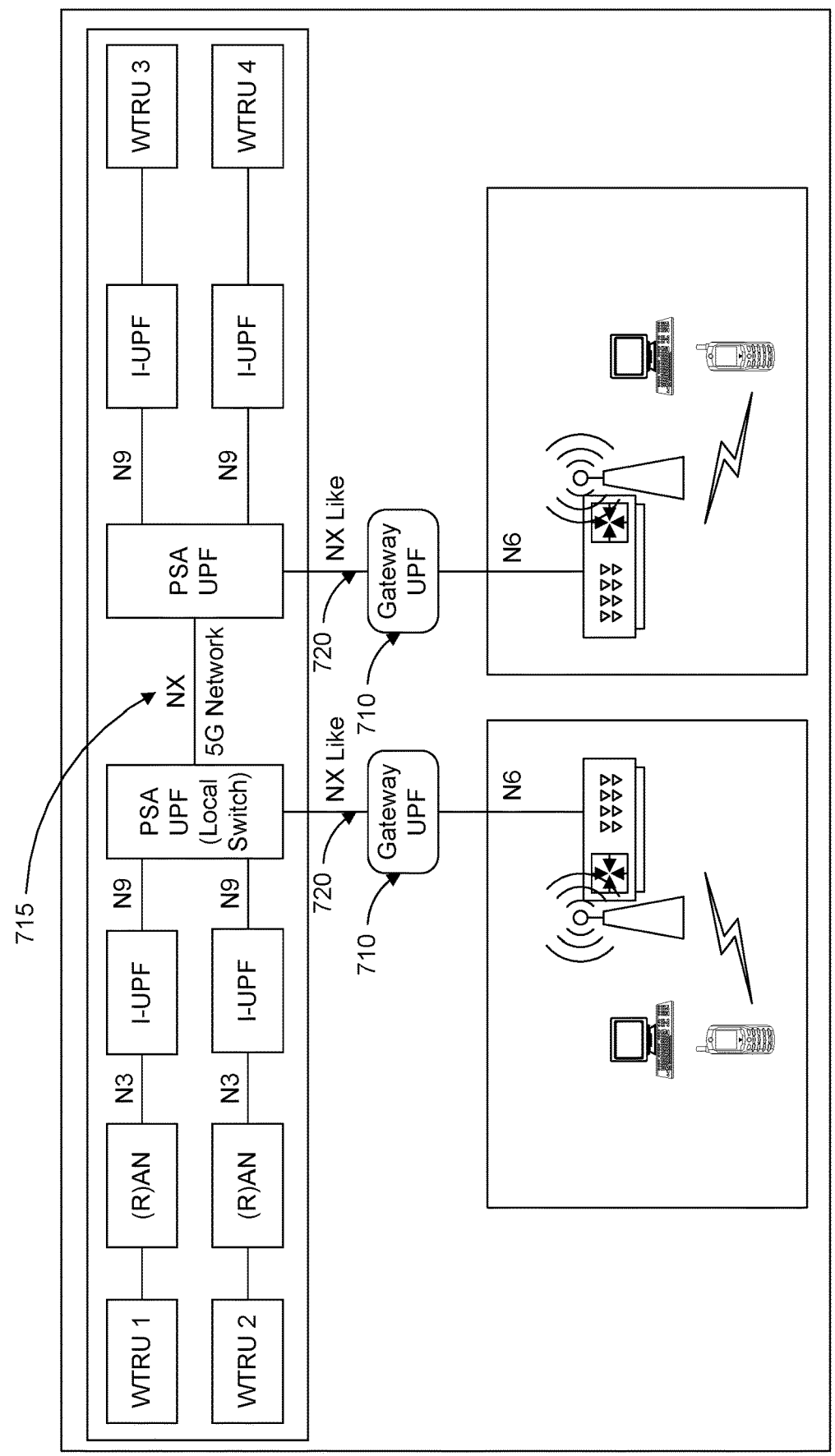
FIG. 7 depicts an example extended 5G LAN service.

FIG. 7 presents a high-level overview of the Extended 5G LAN solution primarily depicting user plane interfaces.

The Extended 5G LAN solution proposes a new function, a special UPF function acting as a Gateway to extend the 5G LAN to non-3GPP service, called the Gateway User Plane Function (GUPF) 710, as shown in FIG. 7. The GUPF 710 functionality is part of the 5G network and may reside within an in-home Gateway, a Set top box, or other Consumer Premise Equipment (CPE). In FIG. 7, the Nx interface 715 is between UPFs. The N4 interface (not shown in FIG. 7) is between SMF and UPF in the 5GC and is a control plane interface. In one embodiment, the SMF will create a GUPF and setup a N4 interface with it. After the N4 interface setup, the SMF will setup a Nx interface between the newly created GUPF and other UPF.

An Nx like 720 interface from a "PSA UPF" to the GUPF, is created for carrying "Extended LAN" traffic. This traffic is carried from devices in an Extended LAN (in-home, non-3GPP) to 5G 3GPP access and vice versa.

Figure 8:
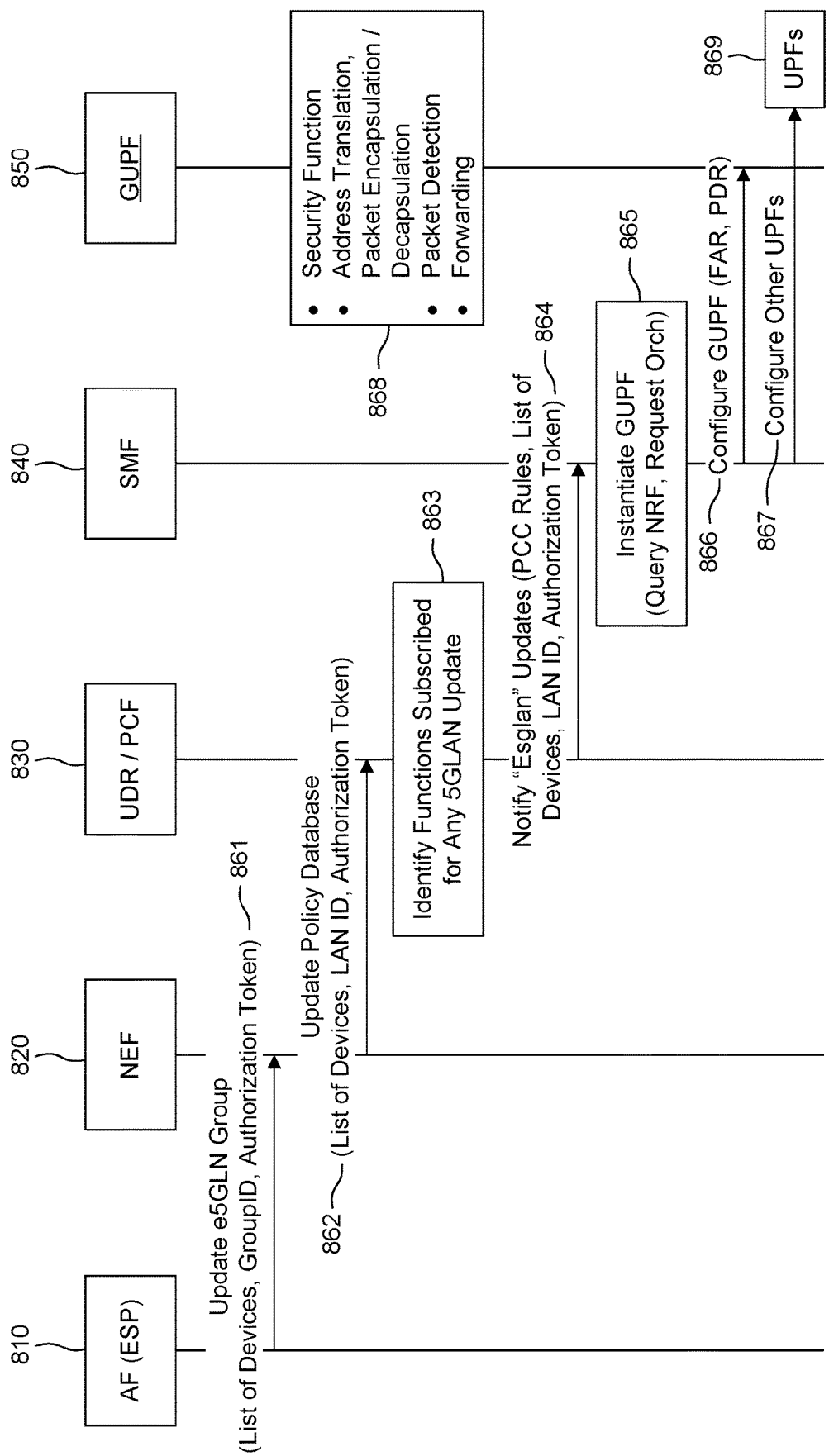
FIG. 8 depicts example steps to create an extended 5G LAN service.

FIG. 8, provides a high-level description of the steps/methods involved in creating and configuring an extended 5G LAN. The steps involved are:
  1. At 861, An external Application Function (AF) 810, sends a request to NEF 820 to create/modify/delete an e5G LAN group.
  2. At 862, NEF 820 authenticates the request, formats the information and stores into the database (UDR) by sending Update_Policy_database( ) to UDR 830.
  3. At 863, UDR 830 finds which Network Functions have subscribed for database changes related to the 5G LAN/e5G LAN. Assuming SMF subscribed to changes in e5G LAN configuration, the UDR 830 notifies SMF 840 by sending Notify_e5GLAN_Updates( ) 864.
  4. At 865, SMF 840 queries NRF (Network Repository Function) to determine if there is any existing GUPF. If not, SMF requests Orchestration function of MNO to instantiate a new GUPF.

5. At 866, Once GUPF 850 is instantiated, SMF 840 configures 866 GUPF (and other UPFs 867) and creates Nx interface by sending Configuration information over the N4 interface.
6. At 868, the GUPF 850 Configures a home router to create the LAN group and set up the GUPF as default gateway for "Extended LAN" communication to communicate with UPFs 869.

Detailed Procedures for Creating and Configuring an Extended 5G LAN

In the paragraphs hereinbelow, the high-level procedures are described in detail.

Creation of e5G LAN Group

Inside a home or in the enterprise, Extended 5G LAN (e5G LAN) may be setup by MNO, Homeowner, Enterprise network administrator, Gaming service provider or any external party. These are examples of an External Service Provider (ESP). The ESP management operation function may be viewed as an AF from the 3GPP network. ESP communicates with NEF to create e5G LAN group. The creation of the e5G LAN may be applicable in two scenarios:

New e5G LAN: Includes 3GPP 5G, 3GPP pre-5G (such at LTE, etc.) devices and Non-3GPP devices.

Update existing e5G LAN: adding, 3GPP 5G, 3GPP pre-5G devices and Non 3GPP devices to the existing 5G LAN group.

The e5G LAN group may be created with 5G devices identified by GPSI and non-3GPP devices identified by Device name, IP address, MAC address etc. The ESP creates the group by putting together the device identifiers and providing the group details to 5GS.

The e5G LAN may be identified by e5G LAN ID, which may be a combination of 5G LAN ID and ESP generated ID. (e5GLAN_ID=5G LAN_ID+ESP ID). ESP may generate the e5G LAN ID and provide it with creation request. The ID may be stored in the UDR for 5GC reference.

Figure 9:
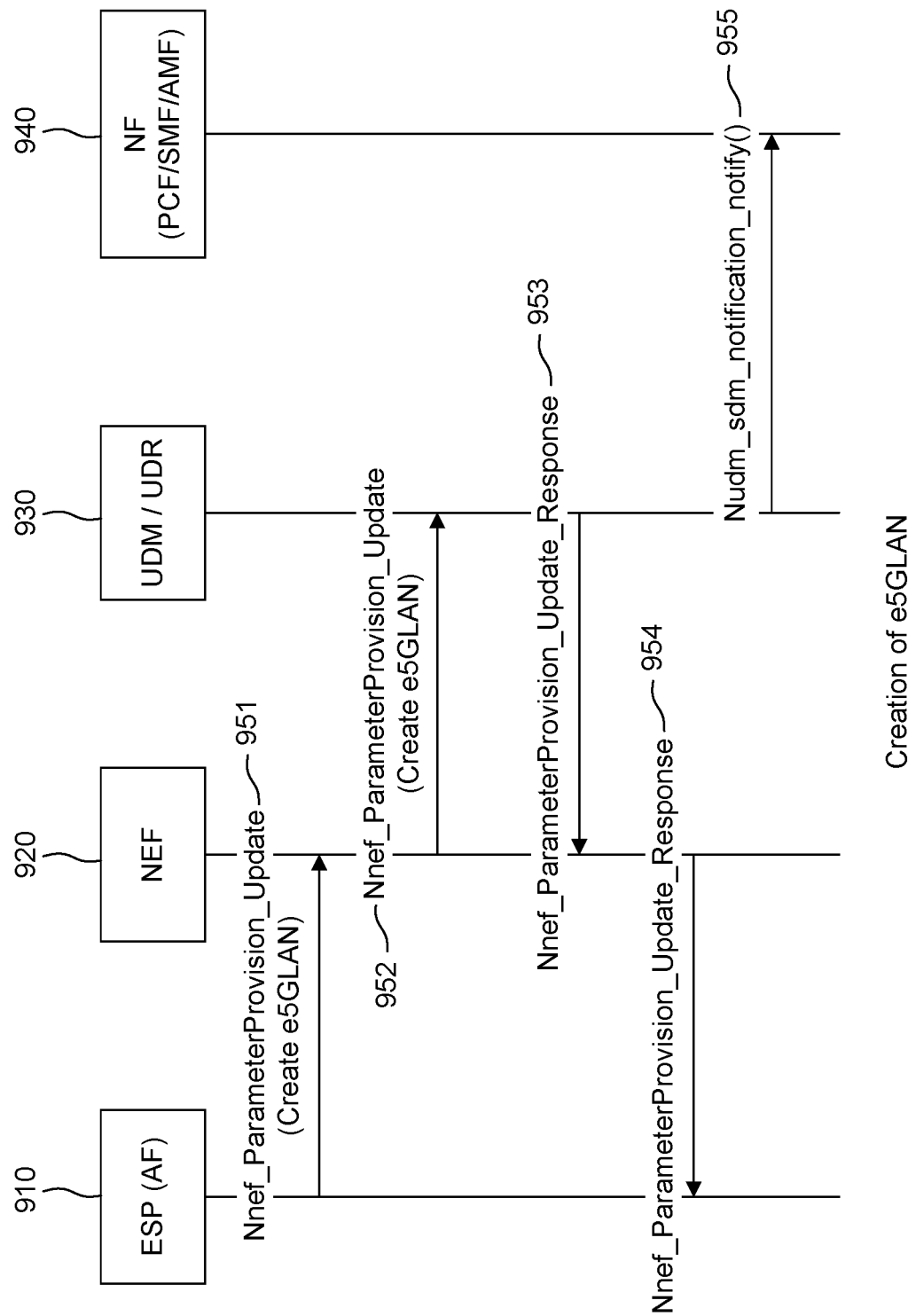
FIG. 9 depicts an example of the creation of a e5G LAN.

FIG. 9 shows the method for creating/configuring an extended 5G LAN service (e5G LAN). The existing procedure between AF 910 and NEF 920 to provision network information can be reused with new information elements (IE)s.

At 910, the ESP may use the "Nnef_Parameter Provision_Update" 951 API to create the e5G LAN. The "Create_e5GLAN" may include:

[e5GLAN_ID, Device Identifiers (device name, IP address, MAC address), List of 5G devices (MSISDN), Local DNAI and Authorization token if any]

Device Identifiers, are used to uniquely identify non-3GPP devices. Device names are created by the ESP, e.g. Headset1, Headset2, etc. These names are stored by 5GC and associated with the e5G LAN ID. 5GC maintains the mapping of Device name and IP address or MAC address. It is assumed that for e5G LAN static IP address is allocated to non-3GPP devices.

List of 5G devices: it is an optional IE, provided by ESP while trying to create a new e5G LAN.

Local DNAI, identifies the data network (DN) name associated with e5G LAN.

Authorization Token, may be used to grant access to the non 3GPP devices.

The NEF 920 responds to the ESP 910 with a response 954. The NEF 920 then forwards the request 952 to UDM 930. The UDM 930 responds 953 to the forwarded request 952. The UDM 930 may try to authorize the request using the Authorization token. If authorized, it goes and updates 5G LAN group information. UDM updates UDR with e5G LAN information. "e5G LAN" may be stored as an addition to an existing 5G LAN information.

At 955, the UDR 930 notifies the PCF, SMF, and AMF 940 about the creation of e5G LAN or any changes to a 5G LAN group (e.g. addition of non-3GPP devices).

The instance of creating a e5G LAN by ESP through NEF is discussed above. This is a case of untrusted AF trying to create an e5G LAN. On the other hand, it is also possible that a trusted AF like Operations, Administration and Maintenance (OA&M) may update UDR/UDM directly, without the need of using NEF. After the update of UDM/UDR by OA&M, the procedure may be the same.

SMF Functions

The SMF checks the e5G LAN update in UDR to determine:
  a. Case 1: If this is a new e5G LAN
  b. Case 2: If an existing 5G LAN modified to e5G LAN (e.g. initial non-3GPP device added to the group)
  c. Case 3: If any changes to e5G LAN happened (e.g. new device 5G/non 3GPP added, deleted etc.)

For Case 1, 2 and 3 above, the following may be assumed:
  a. UDR will notify the correct SMF, based on the 5G device IDs.
  b. Inside 3GPP, e5G LAN will also be identified by 5G LAN ID.

After receiving Nudm_sdm_notification_notify( ) 955 from UDM 930, the SMF 940 retrieves the e5G LAN group details, which includes the GPSI of 3GPP devices and "Non-3GPP Device Identifier" such as IP address or MAC address. The inclusion of non-3GPP identifier in the group, triggers searching for GUPF function.

For case 1 and 2 above, the SMF finds or creates a new GUPF function (or may instruct PSA UPF to activate GUPF function).
  a. SMF may look up for a peer GUPF, e.g. using domain name system (DNS) procedures (3GPP TS 29.303), NRF procedures (3GPP TS 29.510) or local configuration
  b. If not found, SMF may instruct Resource Management function to instantiate a new GUPF function.
  c. SMF stores the GUPF identifier associated with the e5G LAN, maintains the mapping between GUPF ID and 5G LAN ID.

The SMF uses packet forwarding control protocol (PFCP), as defined in 3GPP Specification Change Request (CR) 29.244, to setup the forwarding rules in GUPF and other UPFs.

Figure 10:
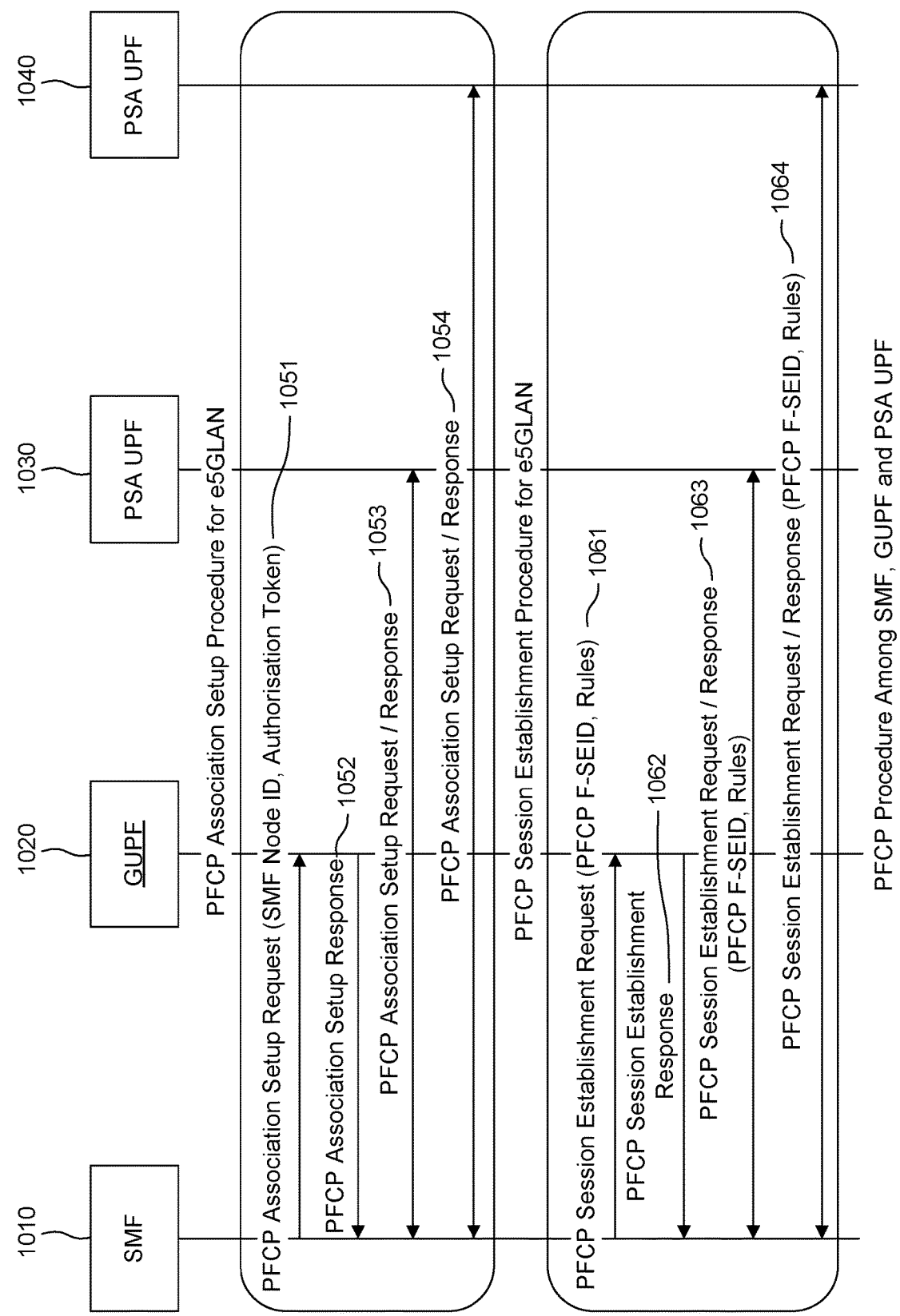
FIG. 10 depicts an example PFCP Procedure among SMF, GUPF and PSA UPF.

FIG. 10 illustrates the PFCP Association and Session Establishment procedure among the SMF 1010, GUPF 1020 and PSA UPF 1030, 1040.

PFCP Association Procedure:

As shown in FIG. 10:
  a. The SMF first initiates PFCP Association procedure with GUPF 1020 and PSA UPF 1030, 1040. A single PFCP association is setup between a SMF and a set of GUPF and UPF. SMF and GUPF may be identified by a unique Node ID. A Node ID may be set to a fully qualified domain name (FQDN) or an IP address. Prior to establishing an PFCP Association, SMF may look up peer functions (e.g. GUPF), using DNS procedures (such as in 3GPP TS 29.303), Network Repository Function (NRF) procedures (such as in 3GPP TS 29.510), or using a local configuration. Once the PFCP Association is established, any of the IP addresses of the peer function (found during the look-up) may then be used to send subsequent PFCP node related messages and PFCP session establishment requests for that PFCP Association. As a result of the look up procedure, SMF, GUPF and other UPFs are now identified by a unique Node ID. A Node ID may be set to an FQDN or an IP address.

b. SMF 1010 initiates the PFCP Association Setup procedure to request 1051 to setup an PFCP association towards a GUPF 1020, prior to establishing a first PFCP session.

send the PFCP Association Setup Request 1051 with its Node ID.

sends the "Authorization Token" received from ESP for this session related to a "e5G LAN" (one Authorization token for each e5G LAN).

c. GUPF 1020 stores the Node ID of the SMF 1010 as the identifier of the PFCP association and the "Authorization Token".

sends an PFCP Association Setup Response 1052 with a successful cause, its Node ID, and information about e5G LAN capability, external interface towards Home network/IP address.

d. SMF 1010 creates a new fully qualified secure element ID (F-SEID) for the session. At 1053, the SMF 1010 and PSA UPF 1030 exchange a PFCP Association Setup Request/Response. At 1054, the SMF 1010 and PSA UPF 1040 exchange a PFCP Association Setup Request/Response.

After successful association, SMF initiates PFCP Session Establishment Procedure.

PFCP Session Establishment Procedure

In FIG. 10, the SMF 1010 creates an "e5G LAN" group-level N4 session with the GUPF 1020 and each involved UPF 1030, 1040, for forwarding packets to 1 or more Nx tunnels. This is a group-level N4 session, not corresponding to a single PDU Session and GUPF is not associated with a PDU session.

As shown in FIG. 10, the SMF 1010 sends "PFCP Session Establishment Request" 1061 over the N4 interface to GUPF 1020 and other UPFs 1030, 1040 to establish a new PFCP session context.

As part of the PFCP Session Establishment Procedure, SMF 1010 updates/creates packet detection rules (PDR)s and forwarding action rules (FAR)s for GUPF 1020 and other involved PSA UPFs 1030, 1040 in the N4 Session. An additional Destination Interface is used for GUPF 1020 to identify the N6 interface towards Home LAN. Also, an additional "e5G LAN Nx" is created between PSA UPF and GUPF. The Network Instance may be set to represent the "e5G LAN group", in order to instruct the GUPF AND UPF to again perform classification of packets using updated "e5G LAN" group relevant PDRs. The GUPF 1020 responds to the establishment request 1061 with an establishment response 1062. At 1063, the SMF and PSA UPF 1030 exchange a PFCP session establishment request and response. At 1064, the SMF and PSA UPF 1040 exchange a PFCP session establishment request and response.

The Table 1 below, describes the information elements sent by SMF 1010 to GUPF, 1020 in the "PFCP Session Establishment Request" of FIG. 10.

As shown in Table 1, the IE "Create PDR" and "Create FAR" contains the non-3GPP device related PDR (Packet Detection Rules) and FAR (Forwarding Action Rules).

Creation of Packet Detection Rules in GUPF

TABLE 1

| Information Elements in an PFCP Session Establishment Request | | | | | | | |
|---|---|---|---|---|---|---|---|
| | | | Appl. | | | | |
| Information elements | P | Condition/Comment | Sx a | Sx b | Sx c | N4 | IE Type |
| Node ID | M | This IE may contain the unique identifier of the sending Node. | X | X | X | X | Node ID |
| CP F-SEID | M | This IE may contain the unique identifier allocated by the CP function identifying the session. | X | X | X | X | F-SEID |
| Create PDR | M | This IE may be present for at least one PDR to be associated to the PFCP session. Several IEs with the same IE type may be present to represent multiple PDRs. See Table 7.5.2.2-1. | X | X | X | X | Create PDR |
| Create FAR | M | This IE may be present for at least one FAR to be associated to the PFCP session. Several IEs with the same IE type may be present to represent multiple FARs. See Table 7.5.2.3-1. | X | X | X | X | Create FAR |
| Create URR | C | This IE may be present if a measurement action may be applied to packets matching one or more PDR(s) of this PFCP session. Several IEs within the same IE type may be present to represent multiple URRs. See Table 7.5.2.4-1. | X | X | X | X | Create URR |
| Create QER | C | This IE may be present if a QoS enforcement or QoS marking action may be applied to packets matching one or more PDR(s) of this PFCP session. Several IEs within the same IE type may be present to represent multiple QERs. See Table 7.5.2.5-1. | — | X | X | X | Create QER |
| Create BAR | O | When present, this IE may contain the buffering instructions to be applied by the UP function to any FAR of this PFCP session set with the Apply Action requesting the packets to be buffered and with a BAR ID IE referring to this BAR. See table 7.5.2.6-1. | X | — | — | X | Create BAR |

TABLE 1-continued

Information Elements in an PFCP Session Establishment Request

| Information elements | P | Condition/Comment | Sx a | Sx b | Sx c | N4 | IE Type |
|---|---|---|---|---|---|---|---|
| Create Traffic End point | C | This IE may be present if the UP function has indicated support of PDI optimization. Several IEs within the same IE type may be present to represent multiple Traffic Endpoints. See Table 7.5.2.7-1. | X | X | X | X | Create Traffic End point |
| PDN Type | C | This IE may be present if the PFCP session is setup for an individual PDN connection or PDU session (see clause 5.2.1). When present, this IE may indicate whether this is an IP or non-IP PDN connection/PDU session or, for 5GC, an Ethernet PDU session. See NOTE 3. | X | X | — | X | PDN Type |
| SGW-C FQ-CSID | C | This IE may be included according to the requirements in clause 23 of 3GPP TS 23.007 [24]. | X | X | — | — | FQ-CSID |
| MME FQ-CSID | C | This IE may be included when received on the S11 interface or on S5/S8 interface according to the requirements in clause 23 of 3GPP TS 23.007 [24]. | X | X | — | — | FQ-CSID |
| PGW-C FQ-CSID | C | This IE may be included according to the requirements in clause 23 of 3GPP TS 23.007 [24]. | X | X | — | — | FQ-CSID |
| ePDG FQ-CSID | C | This IE may be included according to the requirements in clause 23 of 3GPP TS 23.007 [24]. | — | X | — | — | FQ-CSID |
| TWAN FQ-CSID | C | This IE may be included according to the requirements in clause 23 of 3GPP TS 23.007 [24]. | — | X | — | — | FQ-CSID |
| User Plane Inactivity Timer | O | This IE may be present to request the UP function to send a User Plane Inactivity Report when no user plane packets are received for this PFCP session for a duration exceeding the User Plane Inactivity Timer. When present, it may contain the duration of the inactivity period after which a User Plane Inactivity Report may be generated. | — | X | X | X | User Plane Inactivity Timer |
| User ID | O | This IE may be present, based on operator policy. It may only be sent if the UP function is in a trusted environment. See NOTE. | X | X | X | X | User ID |
| Trace Information | O | When present, this IE may contain the trace instructions to be applied by the UP function for this PFCP session. | X | X | X | X | Trace Information |
| APN/DNN | O | This IE may be present, if related functionalities in the UP function require the APN/DNN information. See NOTE 2. | X | X | — | X | APN/DNN |
| Create MAR | C | This IE may be present for a N4 session established for a MA PDU session. Several IEs with the same IE type may be present to represent multiple MARs. See Table 7.5.2.8-1. | — | — | — | X | Create MAR |

NOTE 1:
This can be used for troubleshooting problems in the UP function affecting a subscriber.
NOTE 2:
The CP function may provide additional information (e.g. APN/DNN) to the UP function, e.g. used by the forwarding rules pre-defined in UP function (some forwarding rules are APN specific), used by the UP function for performance measurement, etc.
NOTE 3:
The SGW-C may set PDN type as Non-IP for an Ethernet PDN to allow interworking with a legacy SGW-U.

The following, Table 2, shows the "Create PDR" information element (IE) sent to GUPF 1020 and other UPF 1030, 1040. The IE packet detection information (PDI) and FAR ID represents the new Packet Detection Rule (PDR) and corresponding Forwarding Action to be applied for non-3GPP devices.

TABLE 2

Create PDR IE within PFCP Session Establishment Request

Octet 1 and 2
Create PDR IE Type = 1 (decimal)
Octets 3 and 4
Length = n

| Information elements | P | Condition/Comment | Sx a | Sx b | Sx c | N4 | IE Type |
|---|---|---|---|---|---|---|---|
| PDR ID | M | This IE may uniquely identify the PDR among all the PDRs configured for that PFCP session. | X | X | X | X | PDR ID |

TABLE 2-continued

Create PDR IE within PFCP Session Establishment Request

Octet 1 and 2
Create PDR IE Type = 1 (decimal)
Octets 3 and 4
Length = n

| Information elements | P | Condition/Comment | Appl. Sx a | Sx b | Sx c | N4 | IE Type |
|---|---|---|---|---|---|---|---|
| Precedence | M | This IE may indicate the PDR's precedence to be applied by the UP function among all PDRs of the PFCP session, when looking for a PDR matching an incoming packet. | — | X | X | X | Precedence |
| PDI | M | This IE may contain the PDI against which incoming packets will be matched. See Table 7.5.2.2-2. | X | X | X | X | PDI |
| Outer Header Removal | C | This IE may be present if the UP function is required to remove one or more outer header(s) from the packets matching this PDR. | X | X | — | X | Outer Header Removal |
| FAR ID | C | This IE may be present if the Activate Predefined Rules IE is not included or if it is included but it does not result in activating a predefined FAR, and if the MAR ID is not included. When present this IE may contain the FAR ID to be associated to the PDR. | X | X | X | X | FAR ID |
| URR ID | C | This IE may be present if a measurement action may be applied to packets matching this PDR. When present, this IE may contain the URR IDs to be associated to the PDR. Several IEs within the same IE type may be present to represent a list of URRs to be associated to the PDR. | X | X | X | X | URR ID |
| QER ID | C | This IE may be present if a QoS enforcement or QoS marking action may be applied to packets matching this PDR. When present, this IE may contain the QER IDs to be associated to the PDR. Several IEs within the same IE type may be present to represent a list of QERs to be associated to the PDR. | — | X | X | X | QER ID |
| Activate Predefined Rules | C | This IE may be present if Predefined Rule(s) may be activated for this PDR. When present this IE may contain one Predefined Rules name. Several IEs with the same IE type may be present to represent multiple "Activate Predefined Rules" names. | — | X | X | X | Activate Predefined Rules |
| Activation Time | O | This IE may be present if the PDR activation may be deferred. (NOTE 1) | — | X | X | X | Activation Time |
| Deactivation Time | O | This IE may be present if the PDR deactivation may be deferred. (NOTE 1) | — | X | X | X | Deactivation Time |
| MAR ID | C | This IE may be present if the PDR is provisioned to match the downlink traffic towards the WTRU for a PFCP session established for a MA PDU session. | — | — | — | X | MAR ID |
| Packet Replication and Detection Carry-On Information | C | This IE may be present if the PDR is provisioned to match a broadcast packet. When present, it contains the information to instruct the UPF to replicate the packet and to carry-on the look-up of other PDRs of other PFCP sessions matching the packet (see clause 5.2.1). | — | — | — | X | Packet Replication and Detection Carry-On Information |

NOTE 1:

When the Activation Time and Deactivation Time are not present, the PDR may be activated immediately at receiving the message.

Table 3 shows the details of packet detection information (PDI) information element IE.

TABLE 3

| | | | | Appl. | | | |
|---|---|---|---|---|---|---|---|
| | | | | | | | |

| Information elements | P | Condition/Comment | Sx a | Sx b | Sx c | N4 | IE Type |
|---|---|---|---|---|---|---|---|
| | | PDI IE within PFCP Session Establishment Request Octet 1 and 2 PDI IE Type = 2 (decimal) Octets 3 and 4 Length = n | | | | | |
| Source Interface | M | This IE may identify the source interface of the incoming packet. | X | X | X | X | Source Interface |
| Local F-TEID | O | This IE may not be present if Traffic Endpoint ID is present. If present, this IE may identify the local F-TEID to match for an incoming packet. The CP function may set the CHOOSE (CH) bit to 1 if the UP function supports the allocation of F-TEID and the CP function requests the UP function to assign a local F-TEID to the PDR. | X | X | — | X | F-TEID |
| Network Instance | O | This IE may not be present if Traffic Endpoint ID is present. It may be present if the CP function requests the UP function to allocate a WTRU IP address/prefix and the Traffic Endpoint ID is not present. If present, this IE may identify the Network instance to match for the incoming packet. See NOTE 1, NOTE2. | X | X | X | X | Network Instance |
| WTRU IP address | O | This IE may not be present if Traffic Endpoint ID is present. If present, this IE may identify the source or destination IP address to match for the incoming packet. (NOTE 5) The CP function may set the CHOOSE (CH) bit to 1 if the UP function supports the allocation of WTRU IP address/ prefix and the CP function requests the UP function to assign a WTRU IP address/prefix to the PDR. | — | X | X | X | WTRU IP address |
| Traffic Endpoint ID | C | This IE may be present if the UP function has indicated the support of PDI optimization. If present, this IE may uniquely identify the Traffic Endpoint forthat PFCP session. Several IEs with the same IE type may be present to provision several Traffic Endpoints with different Traffic Endpoint IDs, from which the UPF may receive packets pertaining to the same service data flow, which is subject for the same FAR, QER and URR, if the UPF has indicated it supports MTE feature as specified in clause 8.2.25. See NOTE 6. | X | X | X | X | Traffic Endpoint ID |
| SDF Filter | O | If present, this IE may identify the SDF filter to match for the incoming packet. Several IEs with the same IE type may be present to provision a list of SDF Filters. The full set of applicable SDF filters, if any, may be provided during the creation or the modification of the PDI. See NOTE 3. | — | X | X | X | SDF Filter |
| Application ID | O | If present, this IE may identify the Application ID to match for the incoming packet. | — | X | X | X | Application ID |
| Ethernet PDU Session Information | O | This IE may be present to identify all the (DL) Ethernet packets matching an Ethernet PDU session (see clause 5.13.1). | — | — | — | X | Ethernet PDU Session Information |
| Ethernet Packet Filter | O | If present, this IE may identify the Ethernet PDU to match for the incoming packet. Several IEs with the same IE type may be present to represent a list of Ethernet Packet Filters. The full set of applicable Ethernet Packet filters, if any, may be provided during the creation or the modification of the PDI. | — | — | — | X | Ethernet Packet Filter |
| QFI | O | This IE may not be present if Traffic Endpoint ID is present and the QFI(s) are included in the Traffic Endpoint. If present, this IE may identify the QoS Flow Identifier to match for the incoming packet. Several IEs with the same IE type may be present to provision a list of QFIs. When present, the full set of applicable QFIs may be provided during the creation or the modification of the PDI. | — | — | — | X | QFI |

TABLE 3-continued

PDI IE within PFCP Session Establishment Request

Octet 1 and 2
PDI IE Type = 2 (decimal)
Octets 3 and 4
Length = n

| Information elements | P | Condition/Comment | Appl. Sx a | Sx b | Sx c | N4 | IE Type |
|---|---|---|---|---|---|---|---|
| Framed-Route | O | This IE may be present for a DL PDR if the UPF indicated support of Framed Routing (see clause 8.2.25). If present, this IE may describe a framed route. Several IEs with the same IE type may be present to provision a list of framed routes. (NOTE 5) | — | X | — | X | Framed-Route |
| Framed-Routing | O | This IE may be present for a DL PDR if the UPF indicated support of Framed Routing (see clause 8.2.25). If present, this IE may describe a framed route. | — | X | — | X | Framed-Routing |
| Framed-IPv6-Route | O | This IE may be present for a DL PDR if the UPF indicated support of Framed Routing (see clause 8.2.25). If present, this IE may describe a framed IPv6 route. Several IEs with the same IE type may be present to provision a list of framed IPv6 routes. (NOTE 5) | — | X | — | X | Framed-IPv6-Route |
| Source Interface Type | O | This IE may be present to indicate the 3GPP interface type of the source interface, if required by functionalities in the UP Function, e.g. for performance measurements. | X | X | — | X | 3GPP Interface Type |

NOTE 1:
The Network Instance parameter is needed e.g. in the following cases: PGW/TDF UP function supports multiple PDNs with overlapping IP addresses; SGW UP function is connected to PGWs in different IP domains (S5/S8); PGW UP function is connected to SGWs in different IP domains (S5/S8); SGW UP function is connected to eNodeBs in different IP domains; UPF is connected to 5G-ANs in different IP domains.
NOTE 2:
When a Local F-TEID is provisioned in the PDI, the Network Instance may relate to the IP address of the F-TEID. Otherwise, the Network Instance may relate to the WTRU IP address if provisioned or the destination IP address in the SDF filter if provisioned
NOTE 3:
SDF Filter IE(s) may not be present if Ethernet Packet Filter IE(s) is present.
NOTE 4:
When several SDF filter IEs are provisioned, the UP function may consider that the packets are matched if matching any SDF filter. The same principle may apply for Ethernet Packet Filters and QFIs.
NOTE 5:
If both the WTRU IP/MAC Address and the Framed-Route (or Framed-IPv6-Route) are present, the packets which are considered being matching the PDR may match at least one of them.
NOTE 6:
Maximum 2 Traffic Endpoint ID containing different Local TEIDs per PDI can be provisioned over N4 interface for a PFCP session which is established for a PDU session subject for 5 G to EPS mobility with N26 supported.

Source Interface in PDI:

A new Interface Value is introduced to identify untrusted e5G LAN. This may be also default value when SMF sends PDI to GUPF. Table 4 provides the new Interface Values.

TABLE 4

Interface value

| Interface value | Values (Decimal) |
|---|---|
| Access | 0 |
| Core | 1 |
| SGI-LAN/N6-LAN | 2 |
| N6-LAN non-3GPP e5GLAN | XX |
| PSA UPF e5GLAN | XX |
| CP-function | 3 |
| 5 G VN Internal | 4 |
| Spare | 5 to 15 |

In Table 4, N6-LAN non-3GPP e5G LAN: May be used by GUPF while receiving packets from Home LAN, forwarding packets from non-3GPP side to 3GPP Core.

In Table 4, PSA UPF e5G LAN: may be used by GUPF while receiving packets from PSA UPF, forwarding packets from 5GC side to non-3GPP side.

In Table 3, Local F-TEID: SMF may instruct GUPF to use local fully qualified tunnel endpoint identifier (F-TEID) in PDI rules for packets towards 5G direction. GUPF may assign the Local F-TEID to the interface between Authentication and Authorization Function and Packet Detection Function. On the other direction, the Local F-TEID may be set for each e5G LAN.

In Table 3, Network Instance: The Network instance field is encoded as an Octet String and contains an identifier which uniquely identifies a particular Network instance, PDN instance, Domain Name or an Access Point Name (APN). For e5G LAN service an additional network instance is proposed "e5G LAN", so that GUPF and other UPFs can start reclassification of packets based on the PDI.

In Table 3, WTRU IP/MAC address: SMF may set this to
  a. Source IP address of non-3GPP WTRUs in "non-3GPP' 3GPP" direction.
  b. Destination IP address of non-3GPP WTRUs in "3GPP' non-3GPP" direction.

In Table 3, Ethernet Packet Filter: SMF may use this when MAC address is used for packet detection
  a. Source MAC address of non-3GPP WTRUs in "non-3gpp' 3gpp" direction.
  b. Destination MAC address of non-3GPP WTRUs in "3gpp' non-3gpp" direction.

Creation of FAR (Forwarding Action Rules) in GUPF

SMF provisions one and only one FAR for each PDR provisioned in an PFCP session. The FAR provides instructions to the GUPF and UP function on how to process the packets matching the PDR. By setting the appropriate flag(s) in the Apply Action IE in the FAR, SMF requests the GUPF function to forward the packets (N6 to e5G LAN Nx and vice versa), by setting the FORW flag and by provisioning the "Forwarding Parameters" providing instructions on how to forward the packets.

Details of "Create FAR"

The details of "Create FAR" IE are presented in Table 5:

Bit 4—NOCP (Notify the CP function): when set to 1, this indicates a request to notify the CP function about the arrival of a first downlink packet being buffered.

Bit 5—DUPL (Duplicate): when set to 1, this indicates a request to duplicate the packets.

TABLE 5

Create FAR IE within PFCP Session Establishment Request

Octet 1 and 2
Create FAR IE Type = 3 (decimal)
Octets 3 and 4
Length = n

| Information elements | P | Condition/Comment | Appl. Sx a | Sx b | Sx c | N4 | IE Type |
|---|---|---|---|---|---|---|---|
| FAR ID | M | This IE may uniquely identify the FAR among all the FARs configured for that PFCP session. | X | X | X | X | FAR ID |
| Apply Action | M | This IE may indicate the action to apply to the packets, See clauses 5.2.1 and 5.2.3. | X | X | X | X | Apply Action |
| Forwarding Parameters | C | This IE may be present when the Apply Action requests the packets to be forwarded. It may be present otherwise. When present, this IE may contain the forwarding instructions to be applied by the UP function when the Apply Action requests the packets to be forwarded. See table 7.5.2.3-2. | X | X | X | X | Forwarding Parameters |
| Duplicating Parameters | C | This IE may be present when the Apply Action requests the packets to be duplicated. It may be present otherwise. When present, this IE may contain the forwarding instructions to be applied by the UP function for the traffic to be duplicated, when the Apply Action requests the packets to be duplicated. Several IEs with the same IE type may be present to represent to duplicate the packets to different destinations. See NOTE 1. See table 7.5.2.3-3. | X | X | — | — | Duplicating Parameters |
| BAR ID | O | When present, this IE may contain the BAR ID of the BAR defining the buffering instructions to be applied by the UP function when the Apply Action requests the packets to be buffered. | X | — | — | X | BAR ID |

NOTE 1:

The same user plane packets may be required, according to operator's policy and configuration, to be duplicated to different SX3LIFs.

The Apply Action field is an octet, and encoded as follows:
Bit 1—DROP (Drop): when set to 1, this indicates a request to drop the packets.
Bit 2—FORW (Forward): when set to 1, this indicates a request to forward the packets.
Bit x—FENCAP (Forward with encapsulation): when set to 1, encapsulate the incoming packet with external header and forward
Bit y—FDECAP (Forward after decapsulation): when set to 1, decapsulate the incoming packet and forward
Bit 3—BUFF (Buffer): when set to 1, this indicates a request to buffer the packets.

Bit 6 to 8—Spare, for future use and set to 0.

FENCAP is introduced, so that if GUPF does Address translation or network address translation (NAT) service, it can encapsulate with an external header and forward the packet to 5GC. FDECAP is also introduced so that GUPF can decapsulate a packet from 5GC and forward to Home LAN.

The "Forwarding Parameters" IE in FAR are presented in Table 6.

TABLE 6

Forwarding Parameters Information Element

Octet 1 and 2
Forwarding Parameters IE Type = 4 (decimal)
Octets 3 and 4
Length = n

| Information elements | P | Condition/Comment | Appl. Sx a | Sx b | Sx c | N4 | IE Type |
|---|---|---|---|---|---|---|---|
| Destination Interface | M | This IE may identify the destination interface of the outgoing packet. | X | X | X | X | Destination Interface |
| Network Instance | O | When present, this IE may identify the Network instance towards which to send the outgoing packet. See NOTE 1. | X | X | X | X | Network Instance |
| Redirect Information | C | This IE may be present if the UP function is required to enforce traffic redirection towards a redirect destination provided by the CP function. | — | X | X | X | Redirect Information |
| Outer Header Creation | C | This IE may be present if the UP function is required to add one or more outer header(s) to the outgoing packet. If present, it may contain the F-TEID of the remote GTP-U peer when adding a GTP-U/UDP/IP header, or the Destination IP address and/or Port Number when adding a UDP/IP header or an IP header or the C-TAG/S-TAG (for 5GC). See NOTE 2. | X | X | — | X | Outer Header Creation |
| Transport Level Marking | C | This IE may be present if the UP function is required to mark the IP header with the DSCP marking as defined by IETF RFC 2474 [22]. When present for EPC, it may contain the value of the DSCP in the TOS/Traffic Class field set based on the QCI, and optionally the ARP priority level, of the associated EPS bearer, as described in clause 5.10 of 3GPP TS 23.214 [2]. When present for 5GC, it may contain the value of the DSCP in the TOS/Traffic Class field set based on the 5QI, the Priority Level (if explicitly signalled), and optionally the ARP priority level, of the associated QoS flow, as described in clause 5.8.2.7 of 3GPP TS 23.501 [28], | X | X | — | X | Transport Level Marking |
| Forwarding Policy | C | This IE may be present if a specific forwarding policy is required to be applied to the packets. It may be present if the Destination Interface IE is set to SGi-LAN/N6-LAN. It may be present if the Destination Interface is set to Core, Access, or CP-Function. See NOTE 2. When present, it may contain an Identifier of the Forwarding Policy locally configured in the UP function. | — | X | X | X | Forwarding Policy |
| Header Enrichment | O | This IE may be present if the UP function indicated support of Header Enrichment of UL traffic. When present, it may contain information for header enrichment. | — | X | X | X | Header Enrichment |
| Linked Traffic Endpoint ID | C | This IE may be present, if it is available and the UP function indicated support of the PDI optimization feature, (see clause 8.2.25). When present, it may identify the Traffic Endpoint ID allocated for this PFCP session to receive the traffic in the reverse direction (see clause 5.2.3.1). | X | X | — | X | Traffic Endpoint ID |
| Proxying | C | This IE may be present if proxying is to be performed by the UP function. When present, this IE may contain the information that the UPF may respond to Address Resolution Protocol and/or IPv6 Neighbour Solicitation based on the local cache information for the Ethernet PDUs. | — | — | — | X | Proxying |
| Destination Interface Type | O | This IE may be present to indicate the 3GPP interface type of the destination interface, if required by functionalities in the UP Function, e.g. for performance measurements. | X | X | — | X | 3GPP Interface Type |

NOTE 1:
The Network Instance parameter is needed e.g. in the following cases: PGW/TDF UP function supports multiple PDNs with overlapping IP addresses; SGW UP function is connected to PGWs in different IP domains (S5/S8); PGW UP function is connected to SGWs in different IP domains (S5/S8); SGW UP function is connected to eNodeBs in different IP domains; UPF is connected to 5G-ANs in different IP domains.
NOTE 2:
If the Outer Header Creation and Forwarding Policy are present, the UP function may put the user plane packets in the user plane tunnel by applying Outer Header Creation, after enforcing the required Forwarding Policy.

For e5G LAN, "Destination Interface" is updated to include N6 Home LAN. The Destination Interface IE is encoded as shown below in Table 7. The table indicates the type of the interface towards which an outgoing packet is sent.

| Encoding of Destination Interface IE | | | | | | | |
|---|---|---|---|---|---|---|---|
| | Bits | | | | | | |
| Octets | 8 | 7 | 6 | 5 | 4 | 3 | 2 | 1 |
| 1 to 2 | Type = 42 (decimal) | | | | | | |
| 3 to 4 | Length = n | | | | | | |
| 5 | Spare | | | | Interface value | | |
| 6 to (n + 4) | These octet(s) is/are present only if expicitly specified | | | | | | |

The Interface value is encoded as a 4 bits binary integer as specified below in Table 8:

TABLE 8

Interface Value

| Interface value | Values (Decimal) |
|---|---|
| Access (NOTE 1, NOTE 3, NOTE 4) | 0 |
| Core (see NOTE 1) | 1 |
| SGi-LAN/N6-LAN | 2 |
| N6-LAN non-3gpp e5GLAN | XX |
| PSA UPF e5GLAN | XX |
| CP- Function | 3 |
| LI Function (see NOTE 2) | 4 |
| 5 G VN Internal | 5 |
| Spare | 6 to 15 |

NOTE 1:
The "Access" and "Core" values denote a downlink and uplink traffic direction respectively.
NOTE 2:
LI Function may denote an SX3LIF or an LMISF. See clause 5.7.
NOTE 3:
For indirect data forwarding, the Source Interface in the PDR and the Destination Interface in the FAR may both be set to "Access", in the forwarding SGW(s). The Interface value does not infer any traffic direction, in PDRs and FARs set up for indirect data forwarding, i.e. with both the Source and Destination Interfaces set to Access.
NOTE 4:
For a HTTP redirection, the Source Interface in the PDR to match the uplink packets to be redirected and the Destination Interface in the FAR to enable the HTTP redirection may both be set to "Access".

N6-LAN non-3GPP e5G LAN: May be used by GUPF to forward packets from 5G side to non-3GPP side.

GUPF e5G LAN: May be used by PSA UPFs to forward towards GUPF.

Figure 11:
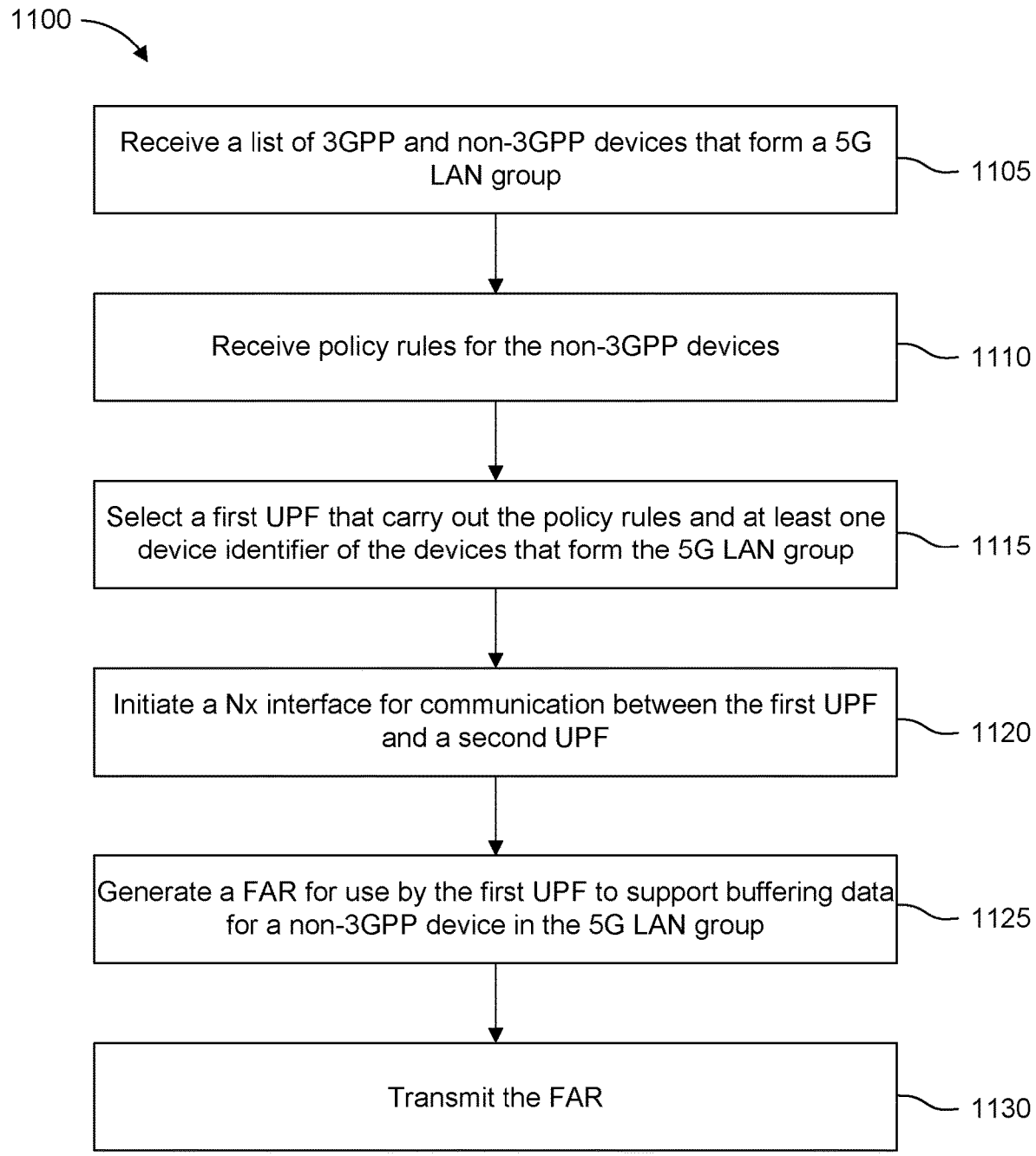
FIG. 11 depicts an example flow diagram for a 5G core function according to features of the disclosure.

FIG. 11 depicts an example flow diagram for a procedure 1100 performed by a network entity. The network entity is assumed to be a 5G, core apparatus. At 1105 the network entity may receive a list of 3GPP devices and non-3GPP devices that form a 5G LAN, group. An updated 5G LAN group (such as an e5G LAN group) device list may be flowed to the network entity, via other 5G core network entities, from an AF. At 1110, the network entity may receive policy rules for the non-3GPP devices. The policy rules received by the network entity may also be flowed to the network entity from other 5G core network entities.

At 1115, the network entity may select a first user plane function (UPF) that can implement/carry out/execute the policy rules and at least one device identifier of the devices that form the 5G LAN group. The first UPF is selected such that the selected UPF can enforce/carry out/implement/accomplish the policy rules. In one embodiment the first UPF may be a GUPF as disclosed herein. At 1120, the network entity may initiate at least one Nx reference point interface for communication between the first UPF and a second UPF. In one embodiment, a second UPF may be a PSA UPF.

At 1125, the network entity may generate a FAR for use by the first UPF to support buffering data for a non-3GPP device in the 5G LAN group. At 1130, the network entity may transmit the FAR to the first UPF. In one embodiment, the network entity may transmit the FAR to a GUPF for its use in controlling the 3GPP and non-3GPP devices of the 5G LAN group.

In one embodiment, the network entity performing the example procedure of FIG. 11 may be a SMF. In one embodiment, the network entity may select a first UPF by either selecting an existing UPF or by selecting or taking the action to instantiate a new UPF that can implement/carry out/execute the policy rules. In one embodiment, the existing or new UPF may be a GUPF as disclosed herein. In one embodiment, the network entity may also transmit a PDR for the first UPF to use. The packet detection rule (PDR) may be configured for the UPF by the SMF. In one embodiment, the network entity may receive list of 3GPP devices and non-3GPP devices that form a 5G LAN group wherein the reception includes the list of devices, a 5G LAN group identifier, and an authorization token generated by an application function.

GUPF Function

Figure 12:
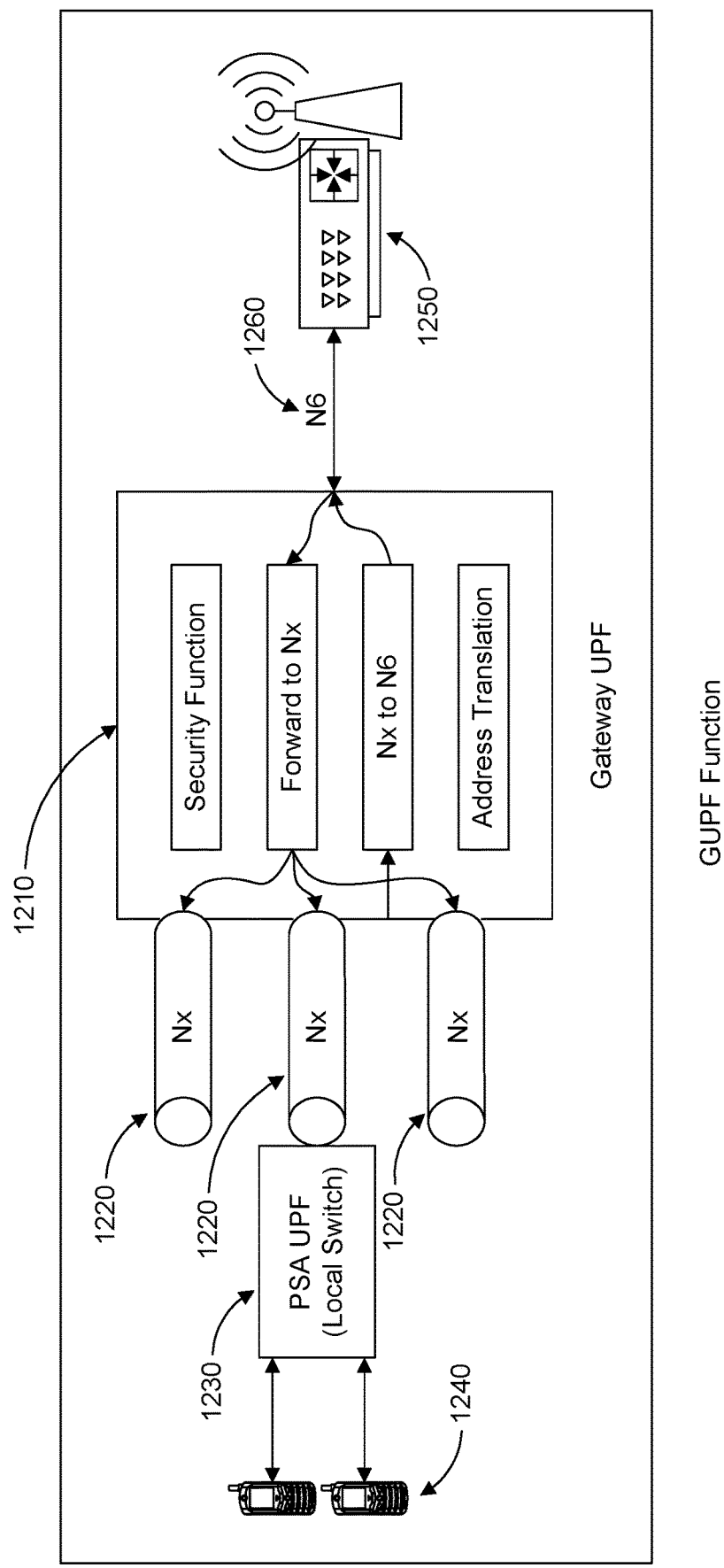
FIG. 12 depicts an example GUPF function.

As shown in FIG. 12, a new function "Gateway UPF" (GUPF) 1210 is introduced to allow non-3GPP devices 1240 to participate in 5G LAN. This may be a standalone function or an additional function in PSA UPF. This function may reside in-home Gateway, Set top box, CPE, etc. The GUPF 1210 is managed and configured by SMF in a similar way as it manages other UPFs. SMF, based on PCC rules and querying NRF, may know the availability of the GUPF function and requests the orchestration function to instantiate a GUPF function at a desired location. The orchestration function can be a MNO's orchestration function, which is responsible for instantiating other Network Functions such as the AMF, SMF, UPF etc. In one embodiment, the Orchestration function of an MNO may be able to instantiate a GUPF function in a similar way it does other network functions.

A Nx tunnel 1120 is established between PSA UPF 1230 and GUPF 1210. It is assumed that the Nx tunnel 1220 is established per e5G LAN group. As such, the GUPF will support a set of Nx tunnels. It is noted that as an alternative implementation, a single Nx tunnel may handle more than one e5G LAN.

An N6 interface 1260 exists from GUPF to HOME or Enterprise Gateway/Router 1250.

The GUPF will support following functions:
 a. Act as a security gateway for non-3GPP devices.
 b. If required, provide address translation service.
 c. Forward traffic from non-3GPP devices, which are part of e5G LAN, to the Nx tunnel between GUPF and PSA UPF.
 d. Traffic received on the Nx tunnel are forwarded to the Home router over N6 interface.

Security Function in GUPF

The GUPF can implement a first level of security check for non-3GPP devices trying to connect to 5G LAN. At the time of creation of e5G LAN, the homeowner or ESP can provide security credentials to 3GPP system. These can be in the form of a Security Token. The SMF may provide these tokens as part of N4 session setup to GUPF. Non-3GPP devices, while sending packets towards 5G LAN, should include the Security Token. The additional functionality in GUPF will be to verify the packets coming from non-3GPP devices against the Security Token.

There are many ways the security mechanism may be implemented. One such method is described. The security function may be implemented as a separate function inside GUPF. It checks each packet received from the Home LAN/N6 interface. If successfully authenticated and authorized, the security function puts the packet in a virtual interface, configured as "Local F-TEID" in the PDR. The packet detection function then processes the packets from Local F-TEID.

Other mechanisms may be also possible, such as:
 a. The PDR is modified to request additional check against the Security Token. If these are satisfied, then the FAR is executed.
 b. A session level authentication is created and all packets using the session authentication token on a specific interface is processed by PDR.

Address Translation Service

Address Translation Service may not be required in the proposed solution above. IP address may be used as an end point identifier and packets are tunneled across UPFs and GUPF. The tunneling happens below layer 3. If IP address is not used, special mechanism to translate other address such as MAC address may be required, which is fast file system (FFS).

"Address translation service" can be an alternate approach to extend 5G LAN to non-3GPP devices, which becomes a Layer 3 solution. Optionally, GUPF may perform IP encapsulation to the packets received from Home LAN over N6 interface. This may be enabled in the PDR by setting "Network Instance" in PDR. e.g., if NAT is used to abstract 5G network, then GUPF can advertise a public IP address for the 5G devices. It will be responsible for translating and sending it to correct 5G WTRU.

It is noted that the following is informational/background info on network address translation (NAT). NAT devices allow the use of private IP addresses on private networks behind routers with a single public IP address facing the Internet. The internal network devices communicate with hosts on the external network by changing the source address of outgoing requests to that of the NAT device and relaying replies back to the originating device. This leaves the internal network ill-suited for hosting servers, as the NAT device has no automatic method of determining the internal host for which incoming packets are destined. This is not a problem for general web access and email. However, in this case of 5G LAN, non-3GPP devices will need to communicate with 5G devices, which may act as a server. Incoming requests cannot be easily correlated to the proper internal host. Furthermore, many of these types of services carry IP address and port number information in the application data, potentially requiring substitution with deep packet inspection. For non-3GPP devices to start a communication with 5G devices, known methods of traversing NAT may be applied.

Packet Processing in GUPF

Figure 13:
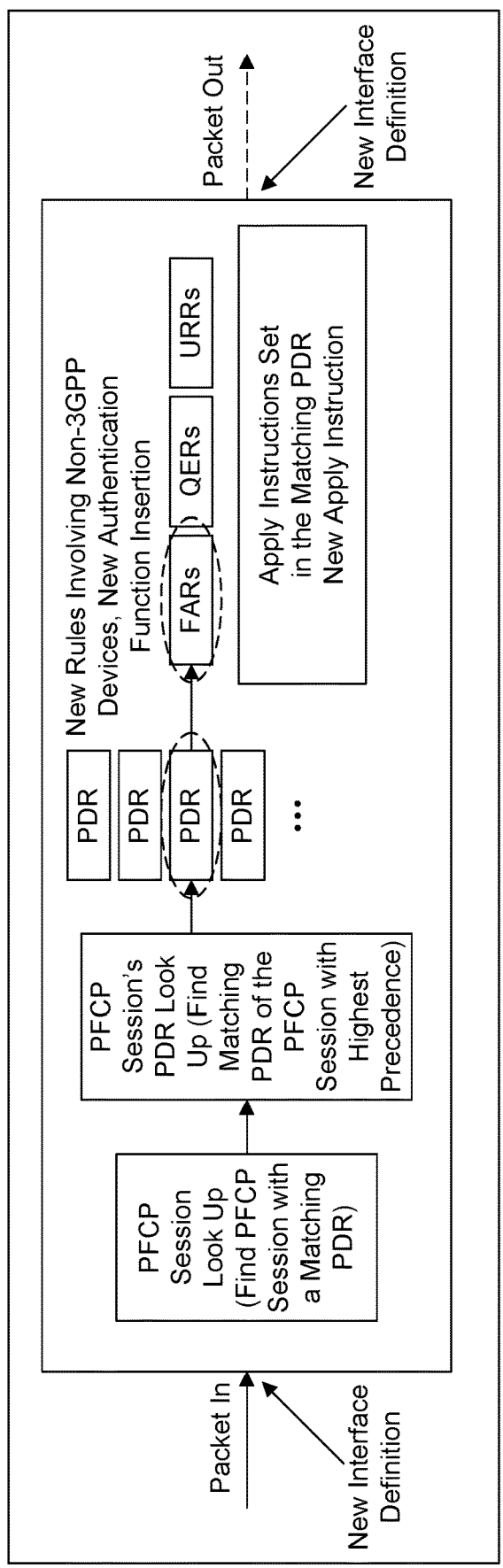
FIG. 13 depicts example processing inside a GUPF.

Packet processing in a UPF is shown in FIG. 13. (See 3GPP CR 29.244). The GUPF will process the packets in a similar way as in UPF (per 3GPP CR 29.244), but with new device names, external IP address in a different domain, forwarding towards newly defined interfaces.

On receipt of a user plane packet, the GUPF function may perform a lookup of the provisioned PDRs and:
 a. Identify the PFCP session to which the packet corresponds. In this case it may be set to "e5G LAN".
 b. Find the first PDR matching the incoming packet, among all the PDRs provisioned for this PFCP session, starting with the PDRs with the highest precedence and continuing then with PDRs in decreasing order of precedence. Only the highest precedence PDR matching the packet may be selected, i.e. the UP function may stop the PDRs lookup once a matching PDR is found.

A typical PDR in GUPF may be identifying incoming packets based on Interface Name, Source IP address, which is the IP address of the non-3GPP devices or MAC address.

In the GUPF, possible method steps involved are:
 a. GUPF matches with the source interface first (identifies a packet coming from or directed to an extended 5G LAN (e5G LAN)):
  N6-LAN non-3GPP e5G LAN (packets coming from Home LAN) using GPSI
  PSA UPF e5G LAN (packets coming from 5GC) using non-GPSI
 b. If enabled, use Local F-TEID, which is the interface between the security function and packet detection/forwarding function, if security function is enabled.
 c. GUPF matches with source IP address of non-3GPP devices
 d. GUPF identifies the network instance as "e5G LAN"
 e. Based on the matching, the GUPF selects the FAR ID and starts parsing the FAR
 f. From the FAR, the GUPF identifies a Destination Interface, either one of:
  N6-LAN non-3GPP e5G LAN (5GC to the Home LAN)
  PSA UPF e5G LAN (Home LAN to the 5GC)
 g. Forwards the packet to the identified destination interface.

These IP addresses are allocated by the ISP and Home router. A packet matches a PDR if all the match fields which are identified with different IE type in the PDI of the PDR are matching the corresponding packet header fields unless specified otherwise.

Handling of PDU Sessions by 5GC and e5G LAN

There is no change in the way PDU sessions are handled and terminated in 5G LAN. In the case of e5G LAN, on the network side, PDU sessions are terminated in UPF/PSA UPF. The GPUF is not responsible for terminating any PDU session.

The user plane of a 5G LAN-type service has two parts, the Access UP and the Backbone UP:
 a. The Access UP contains the UP path of a PDU Session, of which UP paths terminates at an anchor UPF but not to a DN.
 b. The Backbone UP includes one or multiple Nx connections which bridges the UP paths in the Access UP with each other. The GUPF connects to other UPF over Nx connections. The Nx connections in the Backbone UP are managed by the 5GC. Traffic routing over Nx in the Backbone UP is configured at the 5G LAN-type service level (i.e. per hop).

The UPF(s) and GUPF are bridged by Backbone UP functions as a router or switch and treats the user plane path of the PDU Session as the cable connecting the WTRU to one port/interface on the router or switch. The topology of the Backbone UP is implementation specific. It is limited by, but not necessarily identical to the physical interconnectivity of the comprising UPFs.

Depending on implementation and operator's configuration, the Backbone UP (i.e. comprising UPFs and Nx connections in between) can be pre-established before the WTRU requests PDU Session for access to the 5G LAN-type service and updated afterward.

The Nx connections in the Backbone UP support IP traffic and/or Ethernet traffic and are managed by the 5GC. A Nx connection does not belong to a specific PDU Session; it is a per 5G LAN Group connection, shared by multiple PDU Sessions for support of traffic routing between those Sessions.

Operation and Provisioning of Non-3GPP Network

The Home router is provisioned by the homeowner, enterprise network administrator, or ESP.

The home router may be provisioned with two default gateways.
  a. The non-3GPP devices, which are part of extended 5G LAN, get their LAN traffic routed towards the Gateway UPF (GUPF), acting as a default gateway over the N6 interface.
  b. Other devices, which are not part of e5G LAN, trying to access Internet, will be forwarded towards another default gateway. This default gateway may be another UPF.

The Home device may be provisioned with multiple Extended 5G LAN IDs. e.g. a configuration entry can be:
  LAN_ID; Device ID s [{Source Device ID: {non3gpp1, non3gpp2}}, {Destination ID: {5gdevice1, 5gdevice2}} ]; Destination Gateway: GUPF IP ADDRESS Implementation Discussion Future homes will witness the co-existence of different kind of connectivity and access technology. Traditional MNO (5G and beyond) and Cable operators (IEEE 802 technology) may deploy connectivity solutions inside the home. The last mile can be provided by traditional cable operators or by MNO using wireless backhaul. The Customer Premise Equipment (CPE) will become a key element for innovative applications and services. The CPE may be owned by any of the service providers or users may outright buy and own it. A generic customer owned CPE may support multiple access technology and connect to different last mile solutions. The CPE may also include Edge Computing capability.

MNO or other ISPs such as a Cable Operator may deploy CPEs with 5G capability inside home. Application services may be provided by a MNO, a Cable operator, or other third-party application service provider.

Virtualization techniques and Service Based Architectures allow MNOs or Other operators to implement UPF or combination of UPF, SMF inside the CPE. The CPE may also have edge computing capability. In this kind of implementation scenario, UPF function may be enhanced with GUPF function, allowing 5GS to interact with Private LAN inside home. Implementing GUPF in the CPE allows local provisioning by Homeowner or Application Service Provider and separating it from other 5GS functions in the core network.

On another deployment model, a MNO may implement a GUPF inside a 5GS. This may be an extension to UPF function, or implemented as a separate function inside a 5GS, dedicated for residential or enterprise connection. Residential gateways may connect to the GPUF in the 5GS.

In a further development using the principles of a GUPF as described hereinabove, a change of access network may be accommodated for devices connected over a 5G LAN deployed over 3GPP and non-3GPP access networks.

Layer 2 Connectivity by 5G

A 5G System is capable to provide a 5G WTRU with layer 2 connectivity (Ethernet) rather than layer 3 connectivity (IP). Ethernet frames are sent over the 5G radio interface processed by radio protocols and then transported into the 5G Core using GTP-U tunnels. A 5G WTRU may become part of a LAN (Ethernet) where the rest of the LAN is placed in a company or organization somewhere in the Data Network outside the 5G System. UPF acts like a L2 switch, operating on Ethernet frames. An example 5G LAN setup among 5G devices and devices on Private LAN is shown FIG. 5.

3GPP 5G LAN Type Service

3GPP has defined in detail how 5G LAN can be established in 3GPP TS 23.501 and 3GPP TS 3GPP TS 23.502. 5G LAN Type Service is defined as a service over the 5G system offering private communication using IP and/or non-IP type communications. 3GPP also defines 5G LAN-Virtual Network as a virtual network over the 5G system capable of supporting 5G LAN-type service. FIG. 2 depicts the non-roaming user plane architecture to support 5G LAN-type service using a local switch. FIG. 3 depicts the non-roaming user plane architecture to support 5G LAN-type service using Nx tunnel. Nx is a reference point interface between two UPFs for direct routing of traffic between different PDU Sessions without using N6. The N6 reference point interface is the interface between UPF and Data Network. As stated earlier hereinabove, N6 has a per 5G LAN group granularity. 3GPP defines a 5G LAN Group as a set of WTRUs using private communication for 5G LAN-type service.

A Second Problem Statement

A 5G LAN may be created among 5G devices and non-3GPP devices in a Private LAN (i.e. home or enterprise network). The Private LAN may use non-3GPP technology, such as IEEE 802 type technology. It is assumed that non-3GPP devices in the private LAN do not have a 3GPP protocol stack. The 5G LAN may be also created using "Ethernet PDU Session" supported by 5GS.

It is possible that devices may change the network/RAT depending on where they are in the home or enterprise. A 5G device may get connected to Wi-Fi and vice-versa. The devices, while changing the RATs, may acquire new IP address, change MAC address, or use other form of identifier (e.g. Application Layer ID, Name as in ICN etc.). Device identifiers assigned by Private LAN may not be recognizable by 3GPP system.

The UPF, which enables the 5G LAN to extend to non-3GPP system (GUPF function described hereinabove), maintains list of devices and forwards packets based on configured FAR. To continue the LAN service, maintaining the forwarding rule up-to-date based on device identifier, is important. Since 3GPP and non-3GPP devices are part of the extended 5G LAN, the device identifiers are not recognizable across systems. It is to be noted that 5G LAN involving 3GPP only devices, may not have the problem as 5G System abstracts identifier changes, if any and updates FAR accordingly.

Figure 14:
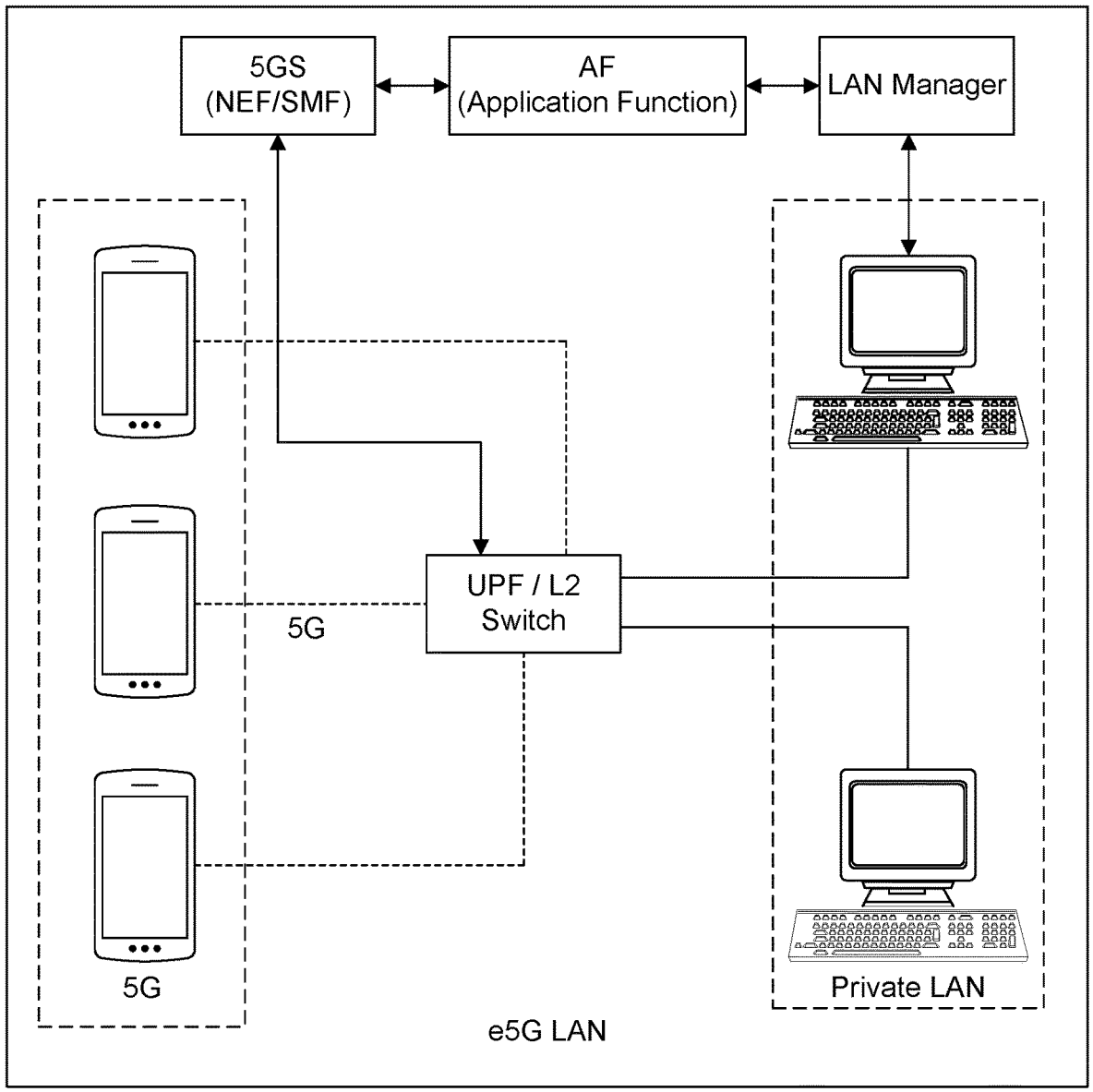
FIG. 14 depicts a 5G LAN service setup.

5G LAN service is managed by an external Application Function (AF), which interacts with 5GS entities like PCF and SMF, through NEF. These network functions configure UPF and PSA UPF for proper routing and forwarding of packets. The AF may interact with the management entity (referred to as LAN Manager) for the Private LAN (Home or Enterprise Private Network). The LAN Manager provides network management, configuration and provisioning functions for the private network. FIG. 14 provides an example setup for 5G LAN service.

To provide 5G LAN service continuity, the FAR in an UPF function should be updated as device changes access technology. FAR supports buffering, which may be used for service continuity. Problems related to buffering and maintaining updated device list in FAR are described below:
  a. Buffering is done based on device identifier. When a device changes access, how to buffer packets meant for the device with old identifier and later release to the device with a new identifier?
  b. When a 3GPP device connects via non-3GPP access, it obtains anew device identifier (e.g. IP address). The FAR may be updated with new identifier, but the new device identifier should be traced back to the previous identifier to release the buffer. How to identify and track that a new device ID co-relates to a previous ID, which it obtained while being connected over 3GPP access? Similar problem is foreseen when a device moves to 3GPP access from non-3GPP access.

Solution Summary for Second Problem Statement

An example solution setup is shown FIG. 14 where the Private LAN may be a Home Network and is used subsequently to describe a solution to the second problem. The solution involves an Application Function (AF), 5GS Control Functions such as PCF, SMF and LAN Manager for the private LAN. The 5GS Control functions (i.e. SMF) configures the UPF to handle RAT changes by devices. The LAN manager does similar function, such as reconfiguring routing tables, route selection, on the Private LAN. The UPF described here is a special UPF, described as GUPF as discussed hereinabove. The solution is based on the GUPF function, which is an enhancement of UPF.

The procedures on the 5GS related to manage 5G LAN are described hereinbelow. The procedures on the Private LAN (Home Network) are not described in detail. The high-level steps related to manage 5G LAN involve:
  1. When a device becomes unavailable (having been previously available to the 5G LAN), the following procedures may be executed:
    a. Reconfigure the FAR in 5G UPF (e.g. GUPF) to remove any forwarding rules related to the device identifier, which became unavailable.
    b. Reconfigure FAR to buffer any communication meant for the device which became unavailable.
  2. When a device becomes available, i.e. device reconnecting to the 5G LAN from the use of another access network, such as a private network using a non-3GPP access technology, the following may be performed:
    a. Reconfigure the FAR in 5G UPF (e.g. GUPF) to add forwarding rules towards the device with a new identifier.
    b. Trace the new device identifier back to the device identifier, which was used in other system and use it to identify the buffer.
    c. Reconfigure FAR to release buffered communication towards the new device identifier.

Figure 15:
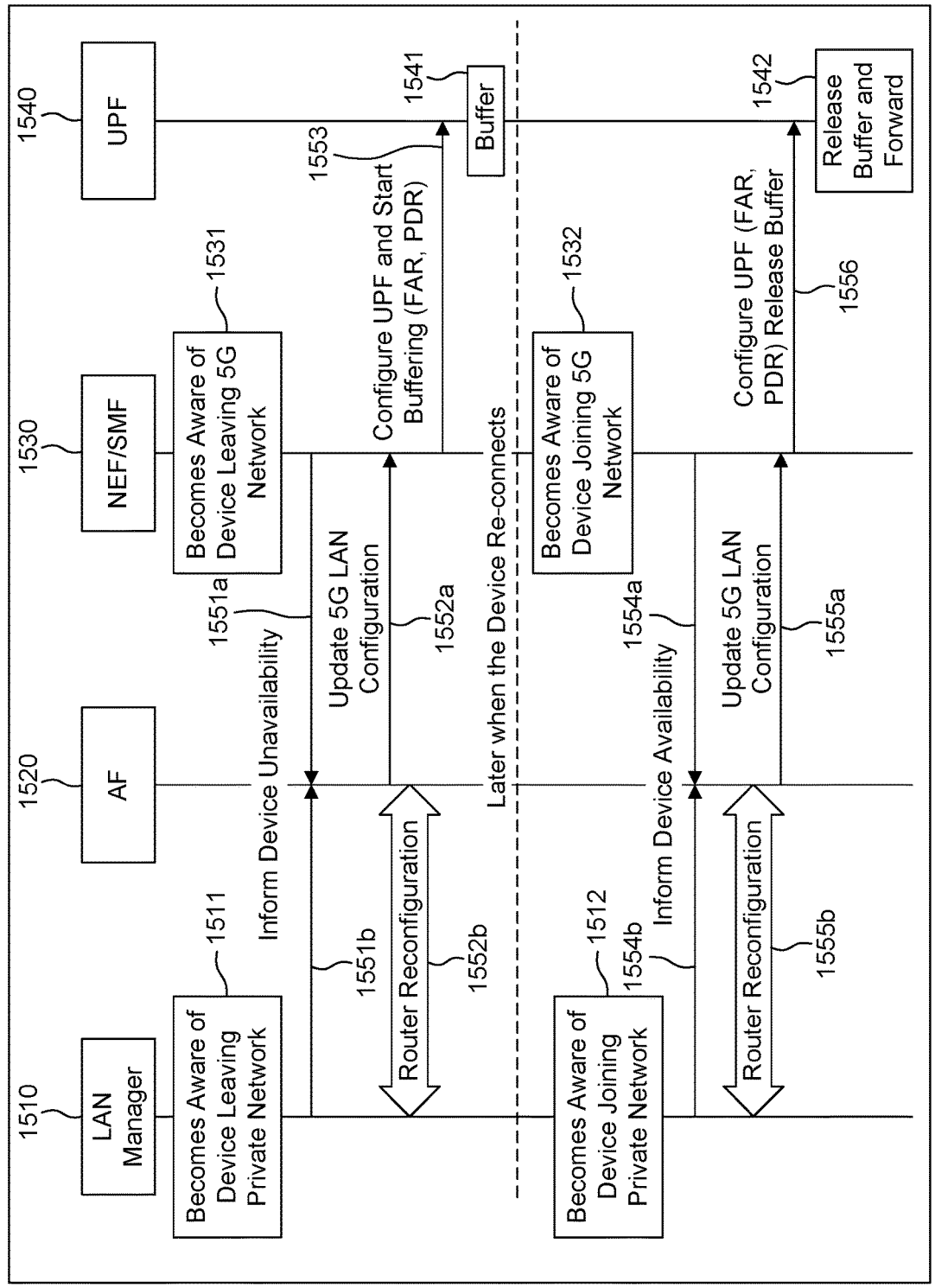
FIG. 15 depicts a diagram having steps to handle a change of access network in a 5G LAN.

FIG. 15 depicts the steps to handle a change of access network in a 5G LAN as follows:
  1. Detection of unavailability of devices at 1511, 1531:
    a. Detecting unavailability of either 5G device or device on Private LAN via LAN Manager 1510:
      i. If 5G device becomes unavailable to the 5G network LAN at 1531, SMF 1530 in the 5GS using mechanism described in 3GPP TS 23.501 and 3GPP TS 23.502 becomes aware of the unavailability of a device in 5G network. SMF 1530 may inform AF 1520 through NEF (also 1530) using known subscribe/notify mechanism at 1551a. (refer to 3GPP TS 23.501, 3GPP TS 23.502)
      ii. If a device on Private LAN becomes unavailable at 1511, LAN Manager 1510 on the Private network (application level mechanism) detects the unavailability of a device and informs AF 1420 via communication 1551b.
    b. Configuration Update at 1552a, 1552b: AF 1520 updates the 5G LAN configuration 1552a through NEF 1530 in PCF/UDR. SMF 1530 gets notified about the update and triggers UPF reconfiguration 1553. The AF 1520 may also Initiate Router reconfiguration 1552b for Private LAN via LAN manager 1510.
    c. Start Buffering at 1553: SMF 1530 instructs the UPF 1540 to start buffering, if it receives any packet for the unavailable device (3GPP and non-3GPP).
  2. Device becomes available again either on 5G network or Private LAN and joins 5G LAN at 1512, 1532:
    a. Detecting availability of either 5G device or device on Private LAN:
      i. SMF 1530 in the 5GS using mechanism described in 3GPP TS 23.501 and 3GPP TS 23.502 becomes aware of the availability of a device in 5G network at 1532. SMF 1530 may inform AF 1520 through NEF (also 1530) using known subscribe/notify mechanism 1554a. (refer to 3GPP TS 23.501, 3GPP TS 23.502)
      ii. If a device on Private LAN becomes available, LAN Manager 1510 on the Private network (application level mechanism) detects the availability of a device at 1512 and informs AF 1520 via communication 1554b.
      iii. Using a mapping table to identify and relate the joining device, to the device which previously became unavailable.
    b. Reconfiguration Update for returning device: AF 1520 updates the 5G LAN configuration via communication 1455a transmitted through to NEF 1530 in PCF/UDR. SMF 1530 gets notified about the update and triggers UPF reconfiguration at 1556. The AF at 1520 may also Initiate Router reconfiguration for Private LAN via LAN Manager 1510 at 1555b.
    c. Release Buffered Packets at 1556: SMF 1520 instructs the UPF 1540 at 1556 to reconfigure 5G LAN forwarding rules and release the buffered packets to the device at 1542.

Detailed Procedures to Handle a Change of Access Network in a 5G LAN

New information elements and tables used in the invention are described first. The later sections cover the procedures in detail. It is assumed that devices on 5G network and Private LAN have been configured to be part of a 5G LAN. These devices are connected and communicating over the 5G LAN.

Application Level Common Identifier

Application Function (AF) may maintain a common application level identifier (APPID) to identify devices as it changes access network. A fixed device identifier may be used for the Private LAN and 5G access. AF may use these identifiers to uniquely identify a device while changing access from one network to the other. For example, the WLAN MAC address is a fixed identifier for WLAN technology in the Private LAN. Similar fixed identifier such as GPSI, IMEI etc. may be used for devices on 3GPP 5G network.

The APPID may map into 5G Identifier such as GPSI, IMEI, MAC address and Private network identifier such as IP address, MAC address as shown in Table 9. Using Table 9, AF can identify/track a device, as it changes access method.

TABLE 9

Application ID to Access specific ID

| APPID | 5 G ID | Private LAN ID |
|---|---|---|
| APPID1001 | GPSI1/IMEI1/MAC1 | IP ADDRESS 1/MAC 1 |

Unavailability of Devices in the 5G LAN
Detection Phase for Unavailability

As the device moves from 5G to Private LAN (e.g. IEEE 802, Fixed) or from Private LAN to 5G, the AF is informed about the unavailability either by SMF/NEF for 5G devices or by the LAN Manager for Private network (application level mechanism, no standard method). The detection and informing the AF is a known method as described in 3GPP TS 23.501 and 3GPP TS 23.502.

Figure 16:
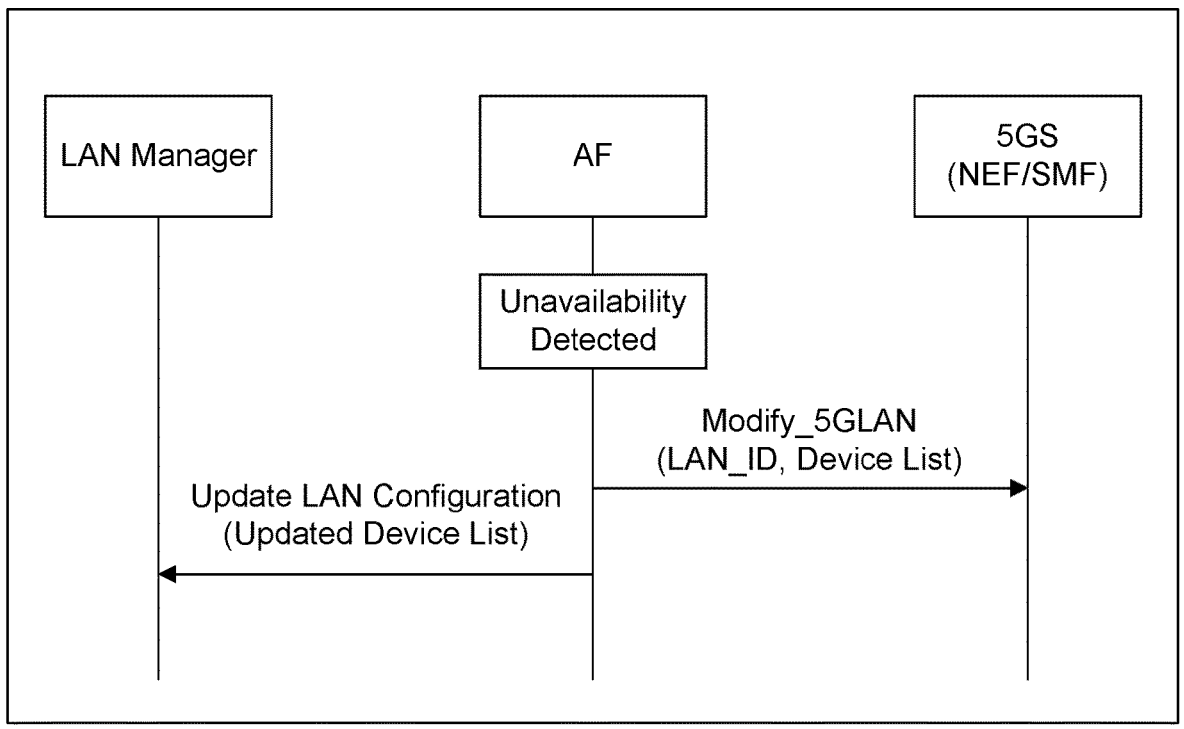
FIG. 16 depicts a configuration update steps for device unavailability.

The AF is provided the access specific ID of the device which became un-available. The AF saves it as a 5G ID or Private LAN ID. This ID is used to search the table described in Table 1. The AF may indicate in the table that the specific ID is unavailable.
Updating LAN Configuration As shown in FIG. 15 at 1552a and 1552b, the AF updates network functions in the 5G and Private LAN about the change in 5G LAN composition. The AF updates SMF in the 5G Core Network about the change in LAN group configuration. The AF may communicate via NEF to inform SMF. The AF also informs LAN manager about changes in the Private LAN group configuration. FIG. 16 shows the high-level steps associated with device unavailability.

In FIG. 16, the AF updates its internal 5G LAN group configuration. The updated LAN configuration removes the device which became unavailable. For example, a 5G device, identified by 5gdevice2, is removed from the group, as shown below.
E.g. [LAN_ID; Device ID s [{ListOfNon3gppDevices: {non3gpp1, non3gpp2, non3gpp3}}, {ListOf3gppDevices: {5gdevice1, 5gdevice2}} ]; Destination Gateway: UPF IP ADDRESS].

AF updates 3GPP UDR/UDM through NEF using the "Nnef_ParameterProvision_Update" API to modify the LAN configuration in 5GS. The "Modify_5GLAN" may include:
 [LAN_ID, PrivateLAN_Device_Identifiers (Device name, IP address, MAC address), List of 5G devices (GPSI, MSISDN) and Authorization token if any]

SMF may subscribe to UDR/UDM for any changes related to the configuration of 5G LAN, identified by the LAN_ID. When AF, updates UDR/UDM to modify the LAN configuration, SMF is notified about the change in 5G LAN configuration. SMF reads the updated LAN configuration from UDR/UDM.

Based on the LAN_ID, SMF identifies the UPF, which connects the non-3GPP devices on private LAN to the 5G LAN. It is assumed that for 5G LAN, SMF remembers the LAN_ID to the UPF mapping as described in hereinabove. SMF also remembers the N4 session context for the UPF. SMF then initiates procedures to reconfigure PDRs and FARs in the UPF.
Reconfiguration of UPF As shown on FIG. 15 at 1553, the UPF 1540 is reconfigured by SMF 1530 over N4 interface to:
 a. Setup new forwarding rules as a device became unavailable
 b. Buffer communication for the device which became unavailable As the device changes access from 3GPP to Private LAN and vice versa, some of the 3GPP known methods of service/session continuity may not be applicable. Session continuity may be handled within the 5G LAN by buffering communication towards the device, which became unavailable. When an interface comes down after the change of access, it may cause termination of the session. But, tying the session to the network interface state is not mandatory. As the WTRU re-stablishes a new session, the buffered data may be forwarded to the new interface.

The UPF supports buffering as described in 3GPP TS 23.501 and 3GPP TS 23.502. This solution uses the buffering function in UPF and buffers for device either on 5G or Private LAN. The SMF provides configuration information to the UPF. The SMF may initiate buffering for 3GPP and non-3GPP devices with configuration information such as buffer size, duration, refresh rate etc.

Figure 17:
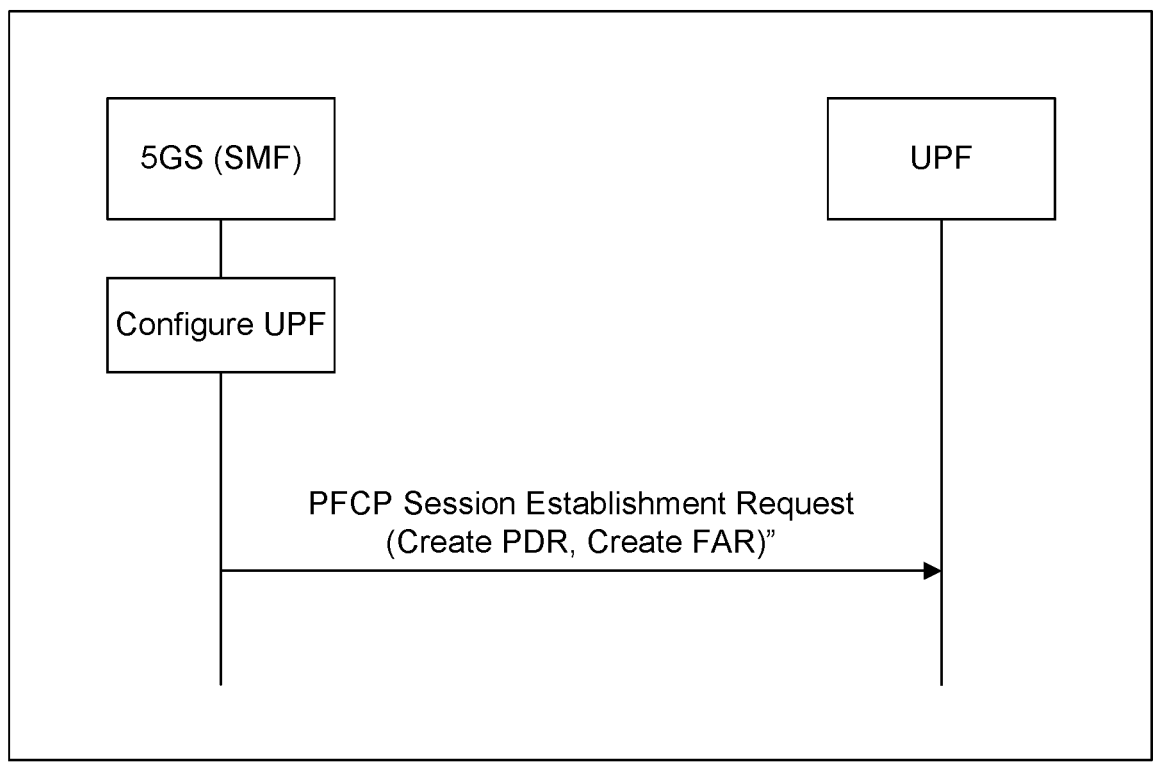
FIG. 17 depicts a UPF update for device unavailability.

The SMF uses PFCP (Packet Forwarding Control Protocol), as defined in 3GPP TS 29.244, to setup the forwarding rules in UPFs. The SMF creates an "5G LAN" group-level N4 session with all the UPFs. As part of the PFCP Session Establishment Procedure, the SMF updates/creates PDR (Packet Detection Rules) and FAR (Forwarding Action Rules) for the UPF in the N4 Session. The SMF sends the IE "Create PDR" and "Create FAR", in the "PFCP Session Establishment Request (Create PDR, Create FAR)". FIG. 17 depicts a UPF configuration message request from the SMF to update unavailability.

The "Create PDR" IE indicates the identifier of the device, which became unavailable. E.g., IP address, MAC address etc. The "Create FAR" IE is shown in Table 10.

TABLE 10

Create FAR IE within PFCP Session Establishment Request

Octet 1 and 2
Create FAR IE Type = 3 (decimal)
Octets 3 and 4
Length = n

| Information elements | P | Condition/Comment | Appl. Sx a | Sx b | Sx c | N4 | IE Type |
|---|---|---|---|---|---|---|---|
| FAR ID | M | This IE shall uniquely identify the FAR among all the FARs configured for that PFCP session. | X | X | X | X | FAR ID |
| Apply Action | M | This IE shall indicate the action to apply to the packets, See clauses 5.2.1 and 5.2.3. | X | X | X | X | Apply Action |

TABLE 10-continued

Create FAR IE within PFCP Session Establishment Request

Octet 1 and 2
Create FAR IE Type = 3 (decimal)
Octets 3 and 4
Length = n

| Information elements | P | Condition/Comment | Appl. Sx a | Sx b | Sx c | N4 | IE Type |
|---|---|---|---|---|---|---|---|
| Forwarding Parameters | C | This IE shall be present when the Apply Action requests the packets to be forwarded. It may be present otherwise. When present, this IE shall contain the forwarding instructions to be applied by the UP function when the Apply Action requests the packets to be forwarded. See table 7.5.2.3-2. | X | X | X | X | Forwarding Parameters |
| Duplicating Parameters | C | This IE shall be present when the Apply Action requests the packets to be duplicated. It may be present otherwise. When present, this IE shall contain the forwarding instructions to be applied by the UP function for the traffic to be duplicated, when the Apply Action requests the packets to be duplicated. Several IEs with the same IE type may be present to represent to duplicate the packets to different destinations. See NOTE 1. See table 7.5.2.3-3. | X | X | — | — | Duplicating Parameters |
| BAR ID | O | When present, this IE shall contain the BAR ID of the BAR defining the buffering instructions to be applied by the UP function when the Apply Action requests the packets to be buffered. | X | — | — | X | BAR ID |

NOTE 1:
The same user plane packets may be required, according to operator's policy and configuration, to be duplicated to different SX3LIFs.

The Apply Action field in Table 10 is an octet, and encoded as defined in 3GPP TS 23.502:
  Bit 1—DROP (Drop): when set to 1, this indicates a request to drop the packets.
  Bit 2—FORW (Forward): when set to 1, this indicates a request to forward the packets.
  Bit 3—BUFF (Buffer): when set to 1, this indicates a request to buffer the packets.
  Bit 4—NOCP (Notify the CP function): when set to 1, this indicates a request to notify the CP function about the arrival of a first downlink packet being buffered.
  Bit 5—DUPL (Duplicate): when set to 1, this indicates a request to duplicate the packets.
  Bit 6 to 8—Spare, for future use and set to 0.

The Apply Action field, BUFF may be used (by setting to 1) to start buffering of user data meant for the device which became unavailable.

Based on PDR, when UPF detects arrival of packets addressed to the device, which became unavailable, starts buffering.

Devices Becoming Available in the 5G LAN

Detection Phase for Availability

As the device moves from 5G to Private LAN (e.g. IEEE 802, Fixed) or from Private LAN to 5G, the AF is informed about the availability either by SMF/NEF for 5G devices or by the LAN Manager for Private network. The detection and informing the AF about 5G device is a known method as described in 3GPP TS 23.501 and 3GPP TS 23.502.

AF is provided the Application ID or Access specific ID of the device, which became available. AF marks it as a 5G ID or Private LAN_ID. The ID is used to search the table described in Table 9. AF retrieves the Identifier associated with the device in the other access network.

Updating LAN Configuration

Figure 18:
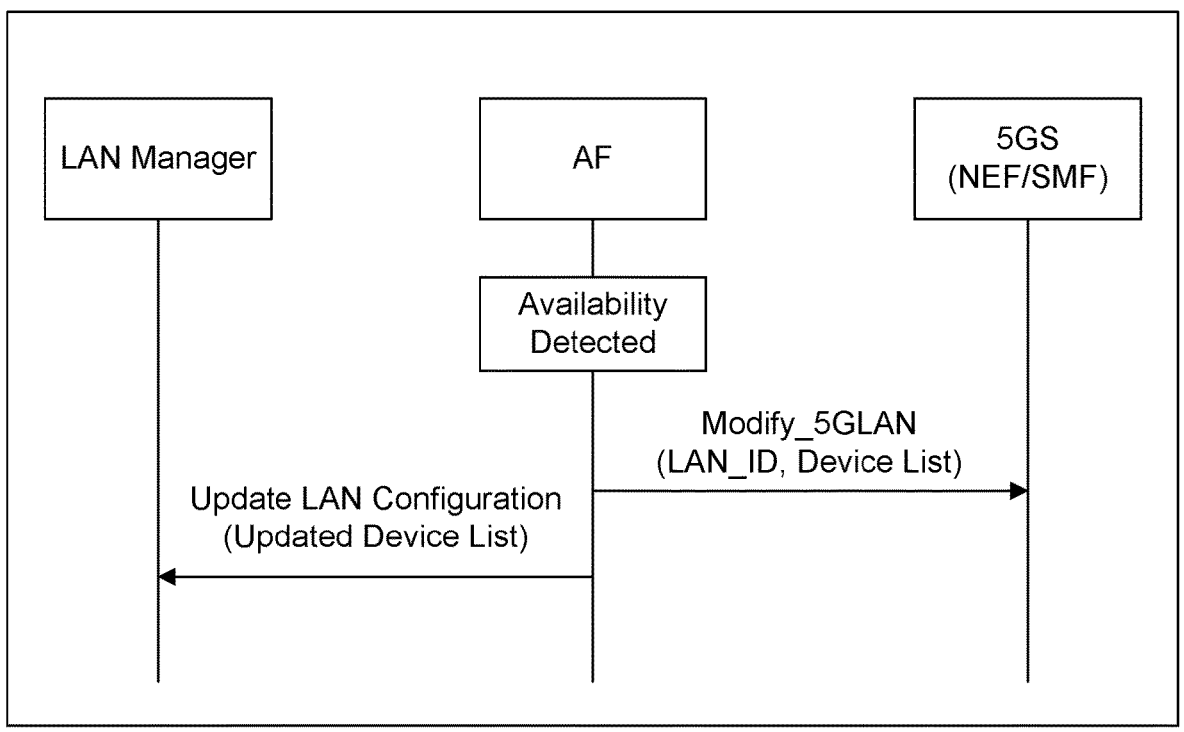
FIG. 18 depicts a configuration update for device availability.

As shown in FIG. 15 at 1554a and 1554b, the AF updates network functions in the 5G and Private LAN about the change in 5G LAN composition. The AF updates SMF in the 5G Network about the change in LAN group configuration. AF also informs LAN manager about changes in the Private LAN group configuration. FIG. 18 shows the high-level steps in a configuration update for a device that has become available.

AF updates its internal 5G LAN group configuration. The updated LAN configuration adds the device which became available. For example, a 5G device, identified by new5gdevice2, is added to the group.

E.g. [LAN ID; Device ID s [{ListOfNon3gppDevices: non3gpp1, non3gpp2, non3gpp3}, {ListOf3gppDevices: {5gdevice1, new5gdevice2}}]; Destination Gateway: UPF IP ADDRESS].

AF updates 3GPP UDR/UDM through NEF using the "Nnef_ParameterProvision_Update" API to modify the LAN configuration in 5GS. The "Modify_5GLAN" may include:
  [LAN_ID, PrivateLAN_Device_Identifiers (Device name, IP address, MAC address), List of 5G devices (GPSI, MSISDN) and Authorization token if any]

SMF may subscribe to UDR/UDM for any changes related to the configuration of 5G LAN, identified by the LAN_ID. When AF, updates UDR/UDM to modify the LAN configuration, SMF is notified about the change in 5G LAN configuration. SMF reads the updated LAN configuration from UDR/UDM.

Based on the LAN_ID and other configuration parameters, the SMF identifies the UPF. It is assumed that for 5G LAN, SMF remembers the LAN_ID to the UPF mapping described hereinabove, which handles the non-3GPP devices on private LAN. SMF triggers procedures to reconfigure the UPF.

Reconfiguration of UPF

As shown in FIG. 15 at 1556, the UPF is reconfigured by the SMF over N4 interface to:
a. Setup new forwarding rules as a device became available
b. Release Buffer to the device which became available When the device changed access and became unavailable, the buffering function in UPF was used. Refer to Reconfiguration of UPF at 1553 in FIG. 15, above. When the device later became available, the SMF reconfigures the UPF to release buffer and forward the buffered packets to the device.

The SMF uses PFCP (Packet Forwarding Control Protocol), as defined in 3GPP TS 29.244, to setup the forwarding rules in UPFs. SMF creates an "5G LAN" group-level N4 session with all the UPFs. As part of the PFCP Session Establishment Procedure, SMF updates/creates PDR (Packet Detection Rules) and FAR (Forwarding Action Rules) for UPF in the N4 Session.

Figure 19:
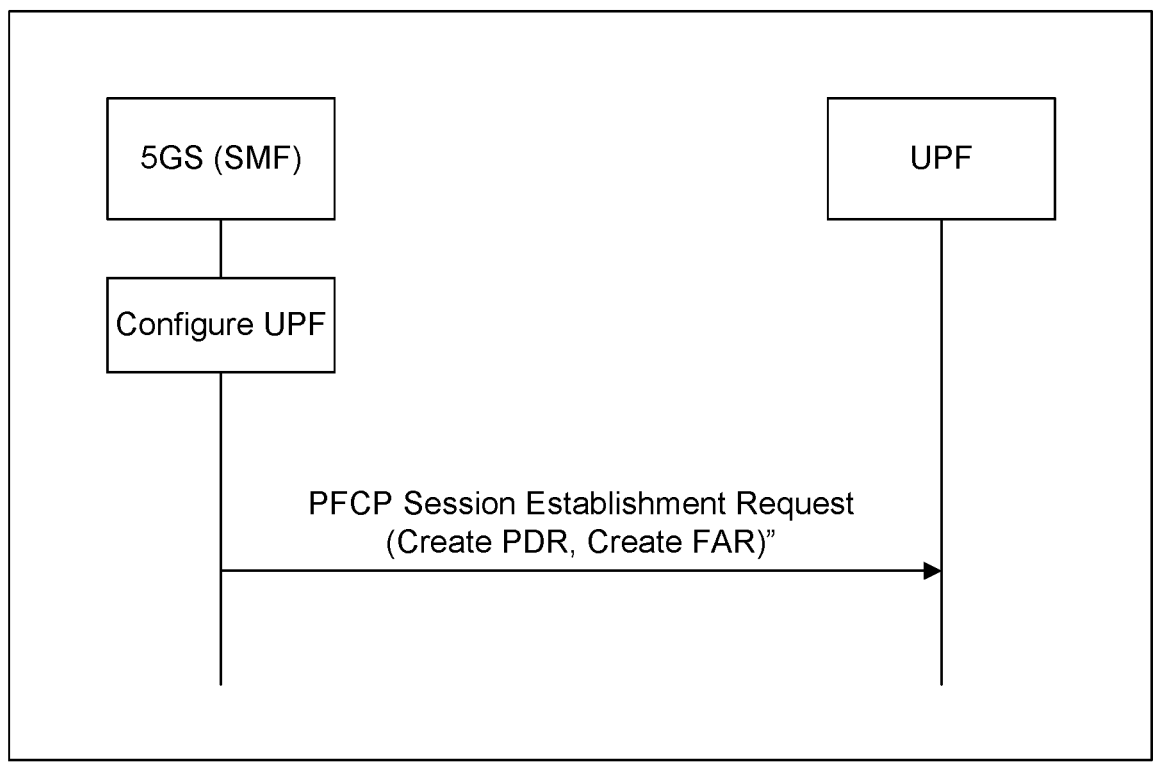
FIG. 19 depicts a UPF update for device availability.

SMF sends the IE "Create PDR" and "Create FAR", in the "PFCP Session Establishment Request (Create PDR, Create FAR)". This step is shown in FIG. 19 showing a UPF Configuration when a device becomes available.

The "Create PDR" IE indicates the identifier of the device, which became unavailable. E.g., IP address, MAC address etc. The "Create FAR" IE is shown in Table 11.

The Apply Action field in Table 11 is an octet, and encoded as defined in 3GPP TS 23.502:
Bit 1—DROP (Drop): when set to 1, this indicates a request to drop the packets.
Bit 2—FORW (Forward): when set to 1, this indicates a request to forward the packets.
Bit 3—BUFF (Buffer): when set to 1, this indicates a request to buffer the packets.
Bit 4—NOCP (Notify the CP function): when set to 1, this indicates a request to notify the CP function about the arrival of a first downlink packet being buffered.
Bit 5—DUPL (Duplicate): when set to 1, this indicates a request to duplicate the packets.
Bit 6 to 8—Spare, for future use and set to 0.

The Apply Action field, may be updated to indicate two new actions:
Bit 6: Release/Stop buffer. Setting it to 1, indicates UPF to stop buffering and release the buffered packets. [Note: Implementation of Bit 2 and Bit 3 is not clear in standard. E.g. Bit 2 says, setting 1 means buffering packet. Implementation of STOP, RELEASE or NO action is not clearly defined.]
Bit 7: F-ENCAP (Forward with encapsulation): when set to 1, encapsulate the buffered packet with external header and forward to the device which became available.

The IE "Forwarding Parameters", may include the information for external header to be used for encapsulation, such as the new IP address of the device which became available.

TABLE 11

Create FAR IE within PFCP Session Establishment Request

Octet 1 and 2
Create FAR IE Type = 3 (decimal)
Octets 3 and 4
Length = n

| Information elements | P | Condition/Comment | Sx a | Sx b | Sx c | N4 | IE Type |
|---|---|---|---|---|---|---|---|
| | | | | Appl. | | | |
| FAR ID | M | This IE shall uniquely identify the FAR among all the FARs configured for that PFCP session. | X | X | X | X | FAR ID |
| Apply Action | M | This IE shall indicate the action to apply to the packets, See clauses 5.2.1 and 5.2.3. | X | X | X | X | Apply Action |
| Forwarding Parameters | C | This IE shall be present when the Apply Action requests the packets to be forwarded. It may be present otherwise. When present, this IE shall contain the forwarding instructions to be applied by the UP function when the Apply Action requests the packets to be forwarded. See table 7.5.2.3-2. | X | X | X | X | Forwarding Parameters |
| Duplicating Parameters | C | This IE shall be present when the Apply Action requests the packets to be duplicated. It may be present otherwise. When present, this IE shall contain the forwarding instructions to be applied by the UP function for the traffic to be duplicated, when the Apply Action requests the packets to be duplicated. Several IEs with the same IE type may be present to represent to duplicate the packets to different destinations. See NOTE 1. See table 7.5.2.3-3. | X | X | — | — | Duplicating Parameters |
| BAR ID | O | When present, this IE shall contain the BAR ID of the BAR defining the buffering instructions to be applied by the UP function when the Apply Action requests the packets to be buffered. | X | — | — | X | BAR ID |

NOTE 1:
The same user plane packets may be required, according to operator's policy and configuration, to be duplicated to different SX3LIFs.

Figure 20:
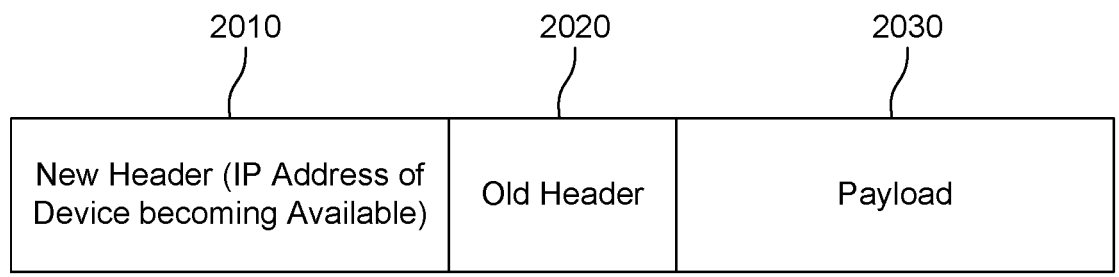
FIG. 20 depicts packet encapsulation for forwarding buffered packets.

FIG. 20 shows an example of an encapsulated packet. Here, the new header 2010 may contain the IP address of the device which re-entered the 5G LAN and once again became available to the 5G LAN. The old header 2020 and the payload 2030 information may be encapsulated with the new header 2010.

Figure 21:
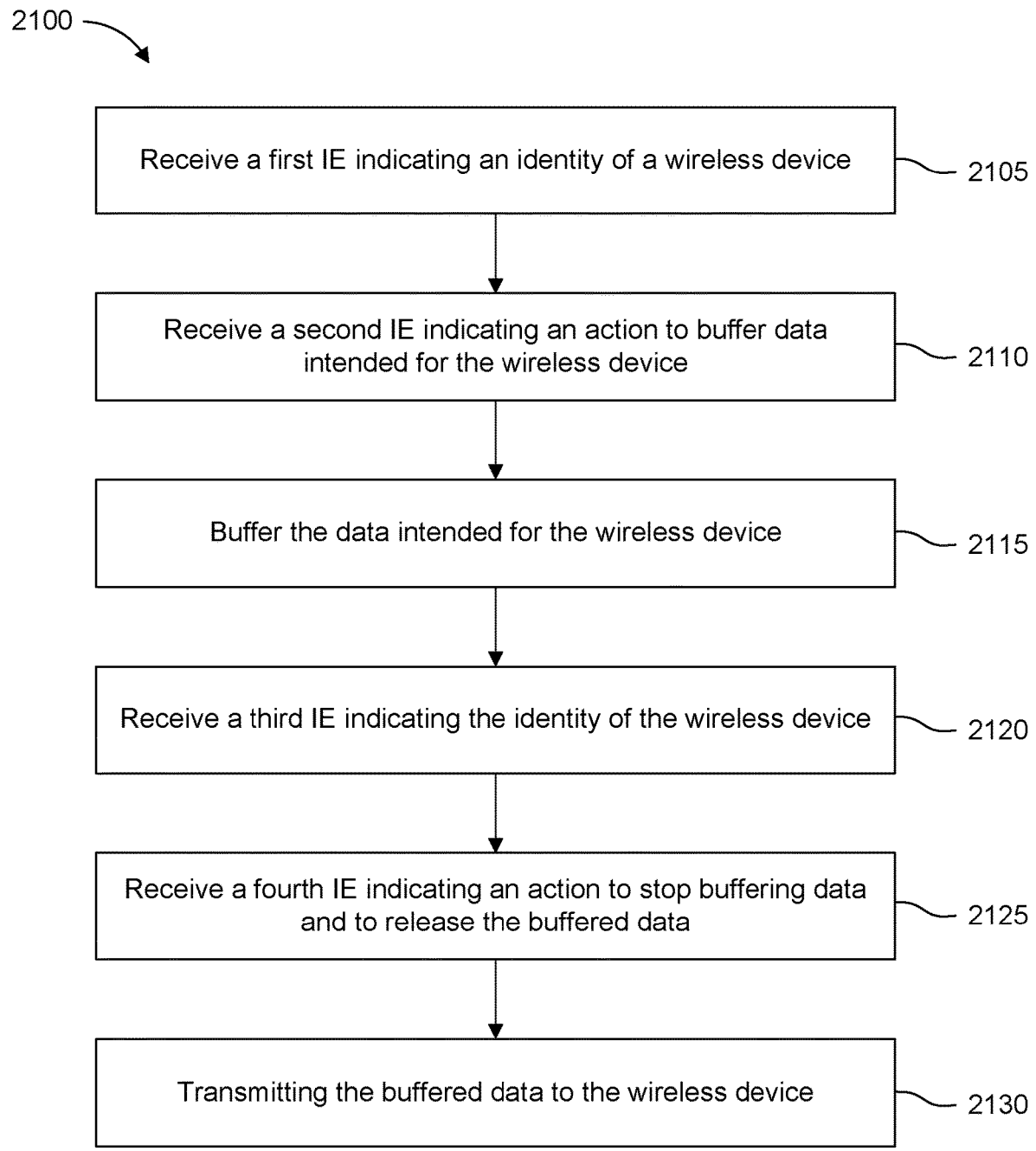
FIG. 21 depicts an example flow diagram of a network entity according to features of the disclosure.

FIG. 21 depicts an example flow diagram of a procedure 2100 conducted by a network entity to control the buffering of data when a wireless device, such as a non-3GPP device, in a 3GPP 5G LAN, such as in an extended 5G LAN, and to control the release of the buffered data once the wireless device rejoins the 5G LAN. In overview, the embodiment may include receiving an instruction to begin buffering data intended for a wireless device that has become unavailable to a LAN, where the wireless device was previously operating in the LAN. Upon the wireless device becoming available again to the LAN, the network entity may receive an instruction to reconfigure a forward action request for the identified wireless device where the request indicates a release of the buffered data intended for the wireless device. A transmission of the buffered data to the wireless device which has rejoined the LAN may then occur. In one embodiment, the network entity may be a UPF, such as the GUPF discussed herein.

In FIG. 21 at 2105, a network entity may receive a first instruction element (IE) indicating an identity of a wireless device. At 2110, the network entity may receive a second IE indicating an action to buffer data intended for the wireless device. At 2115, the network entity causes the data intended for the wireless device to be buffered.

At 2120, the network entity may receive a third IE indicating the identity of the wireless device. At 2125, the network entity may receive a fourth IE indicating an action to stop buffering data and release the buffered data intended for the wireless device. Thereafter, the network entity may act to transmit all or at least a portion of the buffered data to the wireless device.

In one embodiment, the network entity may receive the first IE and the second IE by receiving a packet detection rule IE and receiving a forward action request IE respectively. Receiving the third IE and the fourth IE may include receiving a packet detection rule IE and receiving a forward action request IE respectively.

In one embodiment, the network entity may receive the first IE and the second IE as receiving an indication to begin buffering data intended for a non-3GPP wireless device that has become unavailable to a 5G LAN. Additionally, receiving the third IE and the fourth IE may include receiving an indication to stop buffering data intended for a non-3GPP wireless device that has become available again to a 5G LAN (rejoined the 5G LAN) and to release the buffered data to the wireless device. In one embodiment, the network entity receives the first IE and receives the second IE after the wireless device leaves a 5G LAN. Likewise, the network entity receives the third IE and receives the fourth IE after the wireless device rejoins a 5G LAN.

The network entity may transmit all or at least a portion of the buffered data to the wireless device by transmitting an encapsulation of the buffered data as indicated in a received packet forwarding control protocol IE, such as is contained in the received third or fourth IE. In one embodiment, the network entity may be a UPF. In one example, the UPF may be the GUPF discussed herein.

Although features and elements are provided above in particular combinations, one of ordinary skill in the art will appreciate that each feature or element can be used alone or in any combination with the other features and elements.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed:

1. A method performed by a user plane function, UPF, the method comprising:
    receiving first information including first and second instruction elements, IEs, the first IE indicating a first identifier of a wireless device, the first identifier being associated with a 5G local area network, 5G LAN, the second IE indicating an action to buffer data intended for the wireless device, wherein the first and the second IEs are received in response to or after the wireless device becomes unavailable to the 5G LAN;
    buffering the data intended for the wireless device, the data buffered by the UPF;
    receiving second information including third and fourth IEs, the third IE indicating a second identifier of the wireless device, the second identifier being associated with a second LAN, the fourth IE indicating a second action to stop buffering the data intended for the wireless device, wherein the third and fourth IEs are received in response to or after the wireless device is associated with the second LAN;
encapsulating, using the second identifier, at least a portion of the buffered data intended for the wireless device; and
transmitting the encapsulated buffered data to the wireless device associated with the second LAN.

2. The method of claim 1, wherein receiving the first IE and the second IE comprises receiving a packet detection rule IE and receiving a forward action request IE respectively.

3. The method of claim 1, wherein receiving the third IE and the fourth IE comprises receiving a packet detection rule IE and receiving a forward action request IE respectively.

4. The method of claim 1, wherein receiving the first IE and the second IE comprises receiving an indication to begin buffering data intended for a non-3GPP wireless device that has become unavailable to a 5G LAN.

5. The method of claim 1, wherein receiving the third IE and the fourth IE comprises receiving an indication to stop buffering data intended for a non-3GPP wireless device that has become associated with the second LAN and release the buffered data to the wireless device.

6. The method of claim 1, wherein transmitting at least a portion of the buffered data to the wireless device comprises transmitting an encapsulation of the buffered data as indicated in a packet forwarding control protocol IE.

7. The method of claim 1, wherein the method is performed by a gateway user plane function.

8. The method of claim 1, wherein transmitting at least a portion of the buffered data to the wireless device comprises transmitting an encapsulation of the buffered data as indicated in a packet forwarding control protocol IE.

9. A network entity apparatus comprising circuitry, including a transmitter, a receiver, a processor, and memory, the network entity configured to:
receive first information including first and second instruction elements, IEs, the first IE indicating a first identifier of a wireless device, the first identifier being associated with a 5G local area network, 5G LAN, the second IE indicating an action to buffer data intended for the wireless device, wherein the first and the second IEs are received in response to or after the wireless device becomes unavailable to the 5G LAN;
buffer the data intended for the wireless device, the data buffered by the network entity;
receive second information including third and fourth IEs, the third IE indicating a second identifier of the wireless device, the second identifier being associated with a second LAN, the fourth IE indicating a second action to stop buffering the data intended for the wireless device, wherein the third and fourth IEs are received in response to or after the wireless device is associated with the second LAN;
encapsulate, using the second identifier, at least a portion of the buffered data intended for the wireless device; and
transmit the encapsulated buffered data to the wireless device associated with the second LAN.

10. The network entity apparatus of claim 9, wherein the network entity receives a packet detection rule in the first IE and receives a forward action request in the second IE.

11. The network entity apparatus of claim 9, wherein the network entity receives a packet detection rule in the third IE and receives a forward action request in the fourth IE.

12. The network entity apparatus of claim 9, wherein the network entity receives an indication to begin buffering data intended for a non-3GPP wireless device that has become unavailable to a 5G LAN.

13. The network entity apparatus of claim 9, wherein the network entity receives an indication to stop buffering data intended for a non-3GPP wireless device that has become available to a 5G LAN and release the buffered data to the wireless device.

14. The network entity apparatus of claim 9, wherein the network entity comprises a user plane function and transmits an encapsulation of the buffered data as indicated in a packet forwarding control protocol IE.

15. The network entity of claim 9, wherein the network entity is a gateway user plane function.

16. A non-transient computer-readable storage medium comprising instructions which when executed by a computer cause a user plane function, UPF, to perform a method comprising:
receiving first information including first and second instruction elements, IEs, the first IE indicating a first identifier of a wireless device, the first identifier being associated with a 5G local area network, 5G LAN, the second IE indicating an action to buffer data intended for the wireless device, wherein the first and the second IEs are received in response to or after the wireless device becomes unavailable to the 5G LAN;
buffering the data intended for the wireless device, the data buffered by the UPF;
receiving second information including third and fourth IEs, the third IE indicating a second identifier of the wireless device, the second identifier being associated with a second LAN, the fourth IE indicating a second action to stop buffering the data intended for the wireless device, wherein the third and fourth IEs are received in response to or after the wireless device is associated with the second LAN;
encapsulating, using the second identifier, at least a portion of the buffered data intended for the wireless device; and
transmitting the encapsulated buffered data to the wireless device associated with the second LAN.

17. The non-transient computer-readable storage medium of claim 16, wherein receiving the first IE and the second IE comprises receiving a packet detection rule IE and receiving a forward action request IE respectively.

18. The non-transient computer-readable storage medium of claim 16, wherein receiving the third IE and the fourth IE comprises receiving a packet detection rule IE and receiving a forward action request IE respectively.

19. The non-transient computer-readable storage medium of claim 16, wherein receiving the first IE and the second IE comprises receiving an indication to begin buffering data intended for a non-3GPP wireless device that has become unavailable to a 5G LAN.

20. The non-transient computer-readable storage medium of claim 16, wherein receiving the third IE and the fourth IE comprises receiving an indication to stop buffering data intended for a non-3GPP wireless device that has become associated with the second LAN and release the buffered data to the wireless device.

* * * * *